United States Patent
Kuma et al.

(10) Patent No.: US 7,264,784 B2
(45) Date of Patent: Sep. 4, 2007

(54) METHOD FOR TREATING EXHAUST GAS

(75) Inventors: Ryoji Kuma, Himeji (JP); Shinyuki Masaki, Himeji (JP); Noboru Sugishima, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 480 days.

(21) Appl. No.: 10/963,969

(22) Filed: Oct. 12, 2004

(65) Prior Publication Data

US 2005/0112044 A1  May 26, 2005

(30) Foreign Application Priority Data

Oct. 22, 2003  (JP)  ............... 2003-362596
Oct. 22, 2003  (JP)  ............... 2003-362597
Oct. 22, 2003  (JP)  ............... 2003-362598

(51) Int. Cl.
*B01D 53/56* (2006.01)
*B01D 53/64* (2006.01)

(52) U.S. Cl. .................... 423/210; 423/239.1

(58) Field of Classification Search ............ 423/210, 423/239.1
See application file for complete search history.

(56) References Cited

U.S. PATENT DOCUMENTS

| 4,833,113 | A | | 5/1989 | Imanari et al. |
| 4,889,698 | A | * | 12/1989 | Moller et al. ............... 423/210 |
| 6,153,161 | A | | 11/2000 | Fetzer et al. |
| 6,638,485 | B1 | | 10/2003 | Iida et al. |
| 6,960,329 | B2 | * | 11/2005 | Sellakumar .................. 423/210 |
| 7,118,720 | B1 | * | 10/2006 | Mendelsohn et al. ........ 423/235 |
| 2003/0170159 | A1 | | 9/2003 | Honjo et al. |
| 2003/0235525 | A1 | * | 12/2003 | Honjo et al. ................. 423/210 |
| 2005/0147549 | A1 | * | 7/2005 | Lissianski et al. ........... 423/210 |
| 2005/0214187 | A1 | * | 9/2005 | Johnson ....................... 423/235 |

FOREIGN PATENT DOCUMENTS

| CN | 1117890 A | 3/1996 |
| CN | 1208361 A | 2/1999 |
| EP | 0 860 197 A1 | 8/1998 |
| JP | 47-46270 | 11/1972 |
| JP | 63-100918 A | 5/1988 |
| JP | 4-300628 A | 10/1992 |
| JP | 5-31323 A | 2/1993 |
| JP | 07-299328 A | 11/1995 |
| JP | 10-230137 A | 9/1998 |
| JP | 2003-53142 A | 2/2003 |
| JP | 2004-237244 A | 8/2004 |
| WO | WO97/21482 A1 | 6/1997 |

\* cited by examiner

*Primary Examiner*—Timothy C. Vanoy

(57) ABSTRACT

An object of the present invention is to provide a new method for treating an exhaust gas, which can effectively treat an exhaust gas containing a nitrogen oxide and metal mercury over a long term, and also can be applied to treatment of a large volume of an exhaust gas. As a means of achieving this object, a method according to the present invention for treating an exhaust gas comprises performing a reaction of changing metal mercury into mercury halide in the presence of a halogen compound and treatment of a nitrogen oxide, using a Ti—V-containing catalyst, upon treatment of an exhaust gas containing a nitrogen oxide and metal mercury.

9 Claims, 14 Drawing Sheets

METHOD FOR TREATING EXHAUST GAS

BACKGROUND OF THE INVENTION

A. Technical Field

The present invention relates to a method for treating an exhaust gas, which can effectively treat an exhaust gas also containing metal mercury together with a nitrogen oxide.

B. Background Art

Conventionally, as a method for treating a nitrogen oxide (NOx) in an exhaust gas, there is known a selective catalyst reducing method (so-called SCR method) of catalytically reducing a nitrogen oxide in an exhaust gas on a denitration catalyst using a reducing agent such as ammonia and urea, to decompose a nitrogen oxide into harmless nitrogen and water, and an exhaust gas treating system adopting this has been put into practice.

However, mercury which is a harmful substance likewise a nitrogen oxide (NOx) is contained as metal mercury ($Hg^0$) or mercury halide such as mercury chloride ($HgCl_2$) in an exhaust gas in some cases.

Since when mercury is present as mercury halide, it is easily absorbed into water, it is relatively easy to capture and remove mercury. However, since when mercury is present as metal mercury, it is hardly absorbed in water, it is difficult to remove mercury.

As the technique of removing mercury (including metal mercury) from an exhaust gas, with consideration given to such behavior of the mercury, there have hitherto been known, for example, an active carbon adsorption method and a sodium hypochlorite absorption method (for example, see patent documents 1 and 2 below). More particularly, as an active carbon adsorption method, for example, a method of blowing an active carbon powder into an exhaust gas, and recovering mercury with a bag filter has been put into practice. On the other hand, as a sodium hypochlorite absorption method, for example, a method of directly adding sodium hypochlorite to cooling water in a cooling tower in an exhaust gas treating system, an absorbing solution of a desulfurization absorption tower, supply water of a wet electrostatic precipitator or circulating water has been put into practice.

However, in the active carbon adsorption method, since active carbon with mercury adsorbed thereon cannot be used repeatedly by regenerating the active carbon, substantial cost is required for active carbon and, moreover, disposition of used active carbon becomes a problem. On the other hand, since the sodium hypochlorite absorption method adds sodium hypochlorite to a main equipment of an exhaust gas treating system, corrosion in an apparatus is feared and, at the same time, substantial cost is required for sodium hypochlorite and, moreover, there is a possibility that secondary environmental pollution due to the sodium hypochlorite, and disposition of produced waste water also become a problem. For this reason, both of the active carbon adsorption method and the sodium hypochlorite absorption method are put into practice only in treatment of a small amount of an exhaust gas such as a trash incineration exhaust gas and, thus, it is difficult to apply them to treatment of a large volume of a gas such as an electric power station.

Therefore, there is demanded a new method which can be also applied to treatment of a large volume of an exhaust gas without using active carbon or sodium hypochlorite for the purpose of removing mercury (including metal mercury), and can effectively treat metal mercury together with a nitrogen oxide.

[Patent Document 1] JP-A-031323/1993 (Kokai)
[Patent Document 2] JP-B-046270/1972 (Kokoku)

SUMMARY OF THE INVENTION

A. Object of the Invention

Accordingly, an object of the present invention is to provide a new method for treating an exhaust gas, which can effectively treat an exhaust gas containing a nitrogen oxide and metal mercury over a long term, and can be also applied to treatment of a large volume of an exhaust gas.

B. Disclosure of the Invention

In order to attain the aforementioned object, the present inventors intensively studied and, as a result, focused attention on the fact that, if a catalyst is used in an equilibrium reaction represented by the following (1) equation:

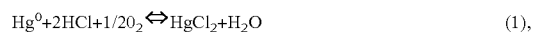

$$Hg^0 + 2HCl + 1/2 O_2 \Leftrightarrow HgCl_2 + H_2O \qquad (1),$$

then the equilibrium shifts towards right, and found that when metal mercury is converted into mercury halide which is easily captured and removed utilizing this reaction, metal mercury can be easily removed from an exhaust gas.

By the way, when the exhaust gas containing not only a nitrogen oxide but also mercury (metal mercury and mercury halide) is simultaneously treated, if an attempt is made to carry out the treatment of the nitrogen oxide with the denitration catalyst, then there is a case where the deterioration of the denitration catalyst is promoted by the accumulation of the mercury. Therefore, the solution to the above problems is desired to be a solving measure which copes also with the problem of the catalyst deterioration due to the mercury accumulation. From such a standpoint, the present inventors further studied and, as a result, found out three new solving measures which can solve the aforementioned problems at a stroke. Specifically, firstly, the present inventors thought that, if a catalyst in a reaction of changing the aforementioned metal mercury into mercury halide can be improved, allowing the catalyst to have high denitration activity, then there are the following advantages: the progress of the catalyst deterioration becomes slow, and further it becomes possible to treat the metal mercury and nitrogen oxide effectively with a small amount of catalyst, so the exhaust gas treatment system can be simplified, and the treatment cost can be reduced. Thus, they continued to study a catalyst in a reaction of converting into mercury halide and, as a result, found that a specified catalyst can effectively function in halogenating metal mercury and, at the same time, has high denitration activity. Secondly, the present inventors found out that, after treatment of a nitrogen oxide has first been made with a denitration catalyst, an equilibrium reaction of the aforementioned (1) equation is shifted in the presence of a halogen compound using a mercury halogenating catalyst towards right, to convert metal mercury into mercury halide which is easily captured and removed, when, in order to avoid reduction in performance of a denitration catalyst due to accumulation of mercury which is feared in the case where an exhaust gas containing not only a nitrogen oxide but also metal mercury is first subjected to nitrogen oxide treatment, it is enough to use a denitration catalyst having a specified total pore volume and, in order to efficiently perform treatment of a nitrogen oxide and halogenation of metal mercury, it is enough to set a temperature of each catalyst in a specified range. Thirdly, the present inventors thought that, as to the treatment of the nitrogen oxide, it is suitable to carry it out using a denitration catalyst, and found that it is enough to avoid the reduction in performance of a denitration catalyst due to accumulation of mercury by first converting metal mercury into mercury halide to remove the mercury halide before performing the above nitrogen oxide treatment.

The present invention has been completed based on these findings.

That is to say, a first method according to the present invention for treating an exhaust gas comprises performing a reaction of changing metal mercury into mercury halide in the presence of a halogen compound and treatment of a nitrogen oxide, using a Ti—V-containing catalyst, upon treatment of an exhaust gas containing a nitrogen oxide and metal mercury.

A second method according to the present invention for treating an exhaust gas comprises treating a nitrogen oxide using a denitration catalyst, and thereafter converting metal mercury into mercury halide in the presence of a halogen compound using a mercury halogenating catalyst, upon treatment of an exhaust gas containing a nitrogen oxide and metal mercury, wherein a catalyst having a total pore volume of 0.20 to 0.80 $cm^3/g$ as measured by a mercury pressing method is used as the denitration catalyst, a catalyst temperature of the denitration catalyst is a temperature higher than 300° C., and a catalyst temperature of the mercury halogenating catalyst is 300° C. or lower.

A third method according to the present invention for treating an exhaust gas comprises converting metal mercury into mercury halide in the presence of a halogen compound using a mercury halogenating catalyst, removing the mercury halide from an exhaust gas by capturing with an absorbing solution, and thereafter treating a nitrogen oxide using a denitration catalyst, upon treatment of an exhaust gas containing a nitrogen oxide and metal mercury.

C. Effects of the Invention

According to the new method according to the present invention for treating an exhaust gas, an exhaust gas containing a nitrogen oxide and metal mercury can be effectively treated over a long term. Moreover, since the method according to the present invention for treating an exhaust gas does not need to use active carbon or sodium hypochlorite in order to remove mercury, this can be also applied to treatment of a large volume of an exhaust gas.

These and other objects and the advantages of the present invention will be more fully apparent from the following detailed disclosure.

EXPLANATION OF THE SYMBOLS

Figure 1:
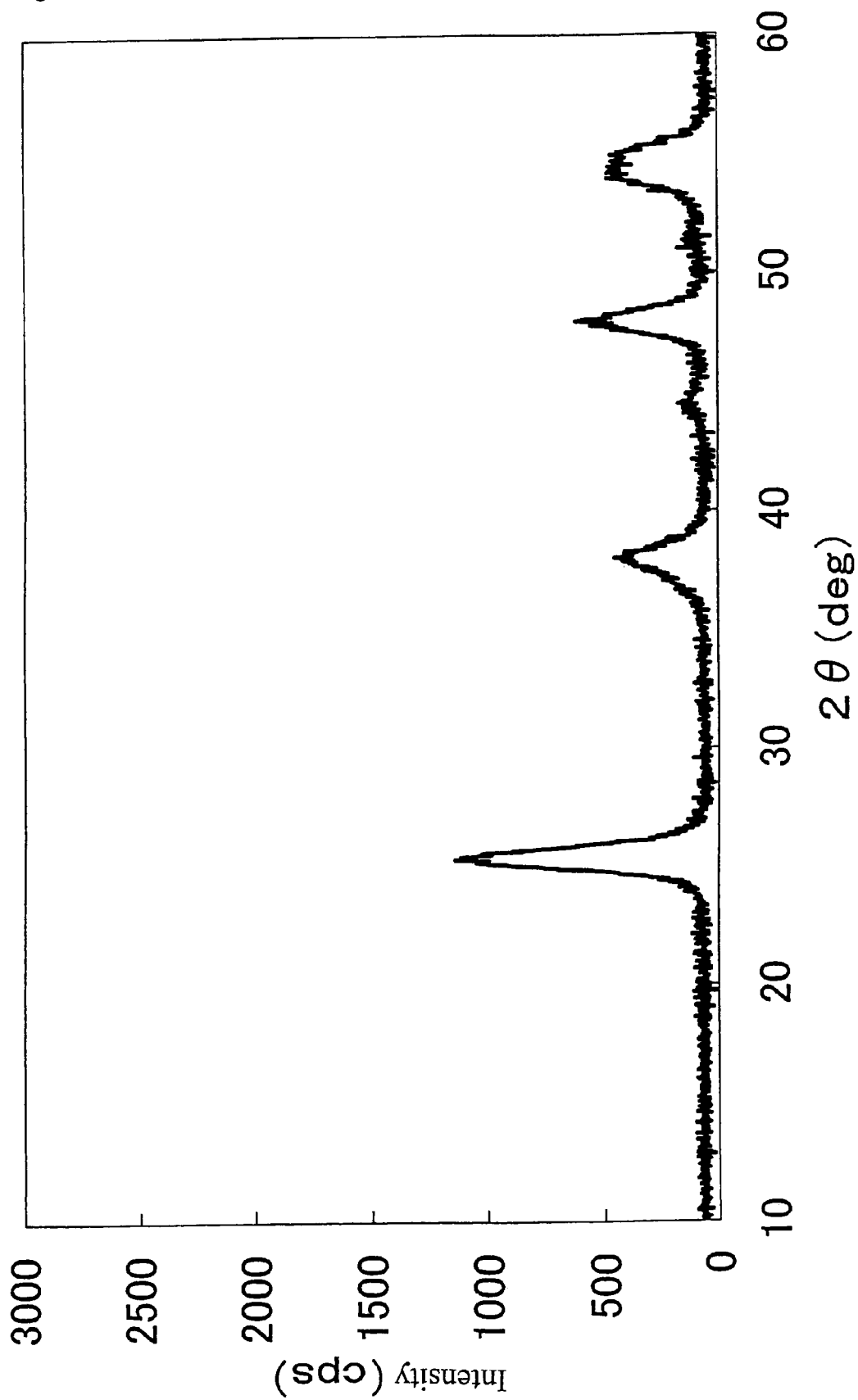
FIG. 1 is an X-ray diffraction pattern of a Ti—V-containing catalyst (1)

1: Exhaust gas container
2: Catalyst apparatus
21: First stage catalyst apparatus
22: Second stage catalyst apparatus
3: Temperature controlling apparatus
4: Absorbing bottle
5: Absorbing solution
6: Recovering bottle
7: Gas sampling port
23: Denitration apparatus
24: Mercury halogenating apparatus

DETAILED DESCRIPTION OF THE INVENTION

Hereinafter, detailed descriptions are given about the first, second and third methods according to the present invention for treating an exhaust gas. However, the scope of the present invention is not bound to these descriptions. And other than the following illustrations can also be carried out in the form of appropriate modifications of the following illustrations within the scope not departing from the spirit of the present invention.

[First Method for Treating Exhaust Gas]:

A first method according to the present invention for treating an exhaust gas is a method for treating an exhaust gas containing a nitrogen oxide and metal mercury, in which a reaction of changing metal mercury into mercury halide in the presence of a halogen compound and treatment of a nitrogen oxide are performed using a Ti—V-containing catalyst.

In the first method according to the present invention for treating an exhaust gas, treatment of a nitrogen oxide (hereinafter, referred to as "denitration" in some cases in item of the first method for treating an exhaust gas) reduces a nitrogen oxide in an exhaust gas by contacting an exhaust gas with a Ti—V-containing catalyst in the presence of a reducing agent such as ammonia and urea. The denitration can be performed by passing an exhaust gas through an apparatus provided with a Ti—V-containing catalyst.

In the first method according to the present invention for treating an exhaust gas, a reaction of changing metal mercury into mercury halide in the presence of a halogen compound (hereinafter, referred to as "mercury halogenating reaction" in some cases in the item of the first method for treating an exhaust gas) is to convert metal mercury in an exhaust gas into mercury halide which is easily captured or removed, by contacting the exhaust gas with a Ti—V-containing catalyst in the presence of a halogen compound.

The mercury halogenating reaction can be performed by passing an exhaust gas through an apparatus provided with a Ti—V-containing catalyst.

Specifically, the mercury halogenating reaction shifts an equilibrium reaction represented by the (1) equation towards right when the halogen compound is HCl. More particularly, examples of the halogen compound include HCl, and HBr. In the mercury halogenating reaction, metal mercury is converted into mercury chloride when the halogen compound is HCl, or converted into mercury bromide when the halogen compound is HBr.

In the mercury halogenating reaction, it is preferable that an amount of the halogen compound is not smaller than a stoichiometric amount, that is, 2 moles or more relative to 1 mole of metal mercury in an exhaust gas. Usually, a gaseous halogen compound is present in an exhaust gas in many cases and, when an exhaust gas to be subjected to treatment contains a gaseous halogen compound at an amount in the aforementioned range, the gaseous halogen compound may be utilized in a mercury halogenating reaction. On the other hand, when an exhaust gas to be subjected to treatment does not contain a gaseous halogen compound, or when the exhaust gas contains the gaseous halogen compound but its amount is smaller than the aforementioned range, it is enough that a halogen compound is supplied to an apparatus in a form of a gas or a liquid, upon a mercury halogenating reaction.

In the first method according to the present invention for treating an exhaust gas, the Ti—V-containing catalyst means a catalyst containing titanium (Ti) and vanadium (V) as an essential component. Such the Ti—V-containing catalyst has high denitration activity, and can exert excellent function as a catalyst for the mercury halogenating reaction.

A content of titanium (Ti) occupied in the Ti—V-containing catalyst is not particularly limited, but is preferably 15 to 99.9% by weight, more preferably 30 to 99% by weight as expressed by a weight ratio in terms of oxide relative to a total weight of the Ti—V-containing catalyst. When a content is less than 15% by weight, sufficient effect is not obtained in some cases due to reduction in a specific surface area. On the other hand, when the content exceeds 99.9% by weight, there is a possibility that sufficient catalyst activity is not obtained.

A content of vanadium (V) occupied in the Ti—V-containing catalyst is not particularly limited, but is preferably 0.1 to 25% by weight, more preferably 1 to 20% by weight as expressed by a weight ratio in terms of oxide relative to a total weight of the Ti—V-containing catalyst. When the content is smaller than 0.1% by weight, there is a possibility that sufficient catalyst activity is not obtained. On the other hand, when the content exceeds 25% by weight, there is a possibility that aggregation of catalyst components occurs, and sufficient performance is not obtained and, at the same time, the cost of a catalyst itself is increased, leading to increase in the exhaust gas treatment cost.

It is preferable that the Ti—V-containing catalyst contains, in addition to titanium (Ti) and vanadium (V), one or more transition metals selected from the group consisting of silicon (Si), zirconium (Zr), aluminum (Al), tungsten (W) and molybdenum (Mo). These transition metals may be contained as independent metal oxide, and it is more preferable that they are contained by formation of a composite oxide with titanium. That is, it is more preferable that the Ti—V-containing catalyst contains a binary or ternary composite oxide of one or two kinds selected from the group consisting of silicon, zirconium, aluminum, tungsten and molybdenum, as well as titanium. Specifically, a binary composite oxide such as Ti—Si, Ti—Zr, Ti—Al, Ti—W, and Ti—Mo; a ternary composite oxide such as Ti—Si—Mo, Ti—Si—W, Ti—Si—Zr, Ti—Si—Al, Ti—Zr—Al, Ti—Zr—Mo, Ti—Zr—W, Ti—Al—Mo, and Ti—W—Mo are preferable in that a stable structure can be maintained, and high resistance to mercury can be exerted. Among them, a binary or ternary composite oxide of silicon (Si) and/or a transition metal containing molybdenum (Mo) as an essential component, and titanium (Ti), such as a binary composite oxide such as Ti—Si, and Ti—Mo, and a ternary composite oxide such as Ti—Si—Mo, Ti—Zr—Mo, Ti—Al—Mo, Ti—Si—W, and Ti—Mo—W is more preferable because denitration activity is higher. Further preferably, among them, a binary or ternary composite oxide of a transition metal containing molybdenum (Mo) as an essential component, and titanium (Ti), such as a binary composite oxide such as Ti—Mo, and a ternary composite oxide such as Ti—Si—Mo, Ti—Zr—Mo, Ti—Al—Mo, and Ti—Mo—W is particularly preferable. Herein, a composite oxide refers to an oxide not showing a clear inherent peak assignable to a substance other than $TiO_2$, and not showing an inherent peak assignable to anatase-type titanium oxide regarding $TiO_2$, or showing a diffraction peak which is broader than a diffraction peak of anatase-type titanium oxide if showing the peak, in a X-ray diffraction pattern.

A composition of each element in the binary or ternary composite oxide is not particularly limited, but for example, a content of a transition metal (one or more kinds selected from the group consisting of silicon (Si), zirconium (Zr), aluminum (Al), tungsten (W) and molybdenum (Mo)) other than titanium (Ti) is preferably 0.5 to 30% by weight, more preferably 1 to 30% by weight, further preferably 1 to 25% by weight as expressed in a weight ratio in terms of oxide of each element.

A process for preparing the binary or ternary composite oxide is not particularly limited, but the previously known methods such as a precipitation method (coprecipitation), a sedimentation method and a kneading method can be adopted. Specifically, for example, a binary composite oxide of titanium (Ti) and molybdenum (Mo) can be obtained by dispersing a molybdenum compound such as ammonium paramolybdate and molybdic acid in an aqueous ammonia solution to obtain an aqueous solution (A), gradually adding an aqueous titanium compound solution dropwise to this aqueous solution (A) under stirring, filtering, washing and further drying the resulting slurry, and calcining this at an elevated temperature of 300 to 600° C. In addition, a ternary composite oxide of titanium (Ti), molybdenum (Mo) and a transition metal (any of Si, Zr, Al and W) can be obtained by further adding an aqueous transition metal (any of Si, Zr, Al and W) salt solution to the aforementioned aqueous solution (A), gradually adding an aqueous titanium compound solution dropwise to the resulting aqueous solution under stirring, filtering, washing and further drying the resulting slurry, and calcining this at an elevated temperature of 300 to 600° C.

A process for preparing the Ti—V-containing catalyst is not particularly limited, but examples include a method of selecting any (one kind or two or more kinds) of the binary or ternary composite oxide containing titanium and the transition metal (one or more kinds selected from the group consisting of silicon (Si), zirconium (Zr), aluminum (Al), tungsten (W) and molybdenum (Mo)), a titanium oxide, and a mixture of a titanium oxide and the transition metal (one or more kinds selected from the group consisting of silicon (Si), zirconium (Zr), aluminum (Al), tungsten (W) and molybdenum (Mo)) oxide as a titanium-containing component, adding an aqueous solution containing a vanadium source together with an organic or inorganic molding aid generally used upon this kind of molding to a powder of the titanium-containing component, heating this while stirring or kneading to evaporate water to obtain an extrudable paste, molding this into a honeycomb with an extruding molding machine, and drying and calcining this at an elevated temperature (preferably 200 to 600° C.) in an air. Alternatively, as another process, a method of molding the titanium-containing component into a shape such as a cylindrical pellet and a lattice-like honeycomb in advance, calcining this, and impregnating this with an aqueous solution containing a vanadium source can be adopted. Alternatively, the catalyst may be prepared by a method of directly kneading a powder of the titanium-containing component with a vanadium oxide powder.

In addition, a source for supplying each element used upon preparation of the Ti—V-containing catalyst is not particularly limited. For example, as a titanium (Ti) source, either of an inorganic compound and an organic compound may be used. For example, an inorganic titanium compound such as titanium tetrachloride and titanium sulfate, or an organic titanium compound such as titanium oxalate and tetraisopropyl titanate can be used. As a vanadium (V) source, in addition to a vanadium oxide, any source can be used, whether an inorganic or organic compound, as far as it can produce a vanadium oxide by calcining. Specifically, hydroxide, ammonium salt, oxalate, halide and sulfate containing vanadium can be used. A molybdenum (Mo) source may be either of an inorganic compound and an organic compound. For example, oxide, hydroxide, ammonium salt and halide containing molybdenum can be appropriately used. Specific examples include ammonium paramolybdate and molybdic acid. A silicon (Si) source can be appropriately used by selecting from an inorganic silicon compound such as colloidal silica, water glass, fine particulate silicon, silicon tetrachloride and silica gel, and an organic silicon compound such as tetraethyl silicate. A zirconium (Zr) source can be appropriately used by selecting from an inorganic zirconium compound such as zirconium chloride and zirconium sulfate, and an organic zirconium compound such as zirconium oxalate. An aluminum (Al) source can be appropriately used by selecting from an inorganic aluminum compound such as aluminum nitrate and aluminum sulfate, and an organic aluminum compound such as aluminum acetate. A tungsten (W) source can be appropriately used by selecting from tungsten oxide, ammonium paratungstate, ammonium metatungstate, and tungstic acid.

A shape of the Ti—V-containing catalyst is not particularly limited, but the catalyst can be used by molding into a desired shape such as a honeycomb, a plate, a net, a circler cylinder, and a cylinder.

A BET specific surface area of the Ti—V-containing catalyst is not particularly limited, but is preferably 20 to 300 m$^2$/g, more preferably 30 to 250 m$^2$/g.

A total pore volume of the Ti—V-containing catalyst is not particularly limited, but a total pore volume as measured by a mercury pressing method is preferably 0.20 to 0.80 cm$^3$/g, more preferably 0.25 to 0.75 cm$^3$/g, further preferably 0.30 to 0.60 cm$^3$/g. When the total pore volume is too small, diffusion of a gas into the interior of a catalyst becomes insufficient, denitration and a mercury halogenating reaction cannot effectively proceed and, as a result, denitration effect and mercury removal rate are reduced. On the other hand, when the total pore volume is too large, a mechanical strength of a catalyst is reduced, a shape is collapsed by slight impact, and this cannot be used as a catalyst.

In the first method according to the present invention for treating an exhaust gas, the denitration and the mercury halogenating reaction may be performed at one-stage using one catalyst apparatus provided with the Ti—V-containing catalyst. Alternatively, they may be used at two or more-stage using two or more catalyst apparatuses each provided with the Ti—V-containing catalyst. In addition, when the denitration and the mercury halogenating reaction are performed at a two or more-stage by two or more catalyst apparatuses, the Ti—V-containing catalyst used in each apparatus may be the same or different.

When the denitration and the mercury halogenating reaction are performed, a catalyst temperature in a catalyst apparatus provided with the Ti—V-containing catalyst is preferably 150 to 550° C., more preferably 150 to 450° C., further preferably 150 to 300° C. In addition, a space velocity of an exhaust gas in a catalyst apparatus provided with the Ti—V-containing catalyst is not particularly limited, but is preferably 100 to 100,000 Hr$^{-1}$, more preferably 200 to 50,000 Hr$^{-1}$. When the space velocity is smaller than 100 Hr$^{-1}$, an apparatus becomes too large, being ineffective. On the other hand, when the space velocity exceeds 100,000 Hr$^{-1}$, there is a tendency that efficacies of denitration and a mercury halogenating reaction are reduced. When the denitration and the mercury halogenating reaction are performed in two or more catalyst apparatuses in a two or more—stage, the treating conditions such as a catalyst temperature and a space velocity in a catalyst apparatus may be set at conditions different from respective apparatuses, or may be set at the same conditions as those of respective apparatuses.

In the first method according to the present invention for treating an exhaust gas, it is preferable to remove mercury halide produced by the mercury halogenating reaction from an exhaust gas by capturing in an absorbing solution. Mercury halide is easily dissolved in an absorbing solution and, by dissolving mercury halide in an absorbing solution, it can be removed from an exhaust gas. As the absorbing solution, for example, water, or an aqueous alkali solution (specifically, an aqueous calcium carbonate solution, an aqueous sodium hydroxide solution, an aqueous sodium carbonate solution etc.) may be used.

[Second Method for Treating Exhaust Gas]:

In the method according to the present invention for treating an exhaust gas, an exhaust gas containing a nitrogen oxide and metal mercury are first subjected to treatment of a nitrogen oxide using a denitration catalyst (hereinafter, referred to as "denitration treatment" in some cases in item of the second method for treating an exhaust gas) and, thereafter, subjected to treatment of converting metal mercury into mercury halide in the presence of a halogen compound using a mercury halogenating catalyst (hereinafter, referred to as "mercury halogenating treatment" in some cases in item of the method for treating an exhaust gas). Respective treatment will be explained in detail below.

In the denitration treatment, a nitrogen oxide in an exhaust gas is treated using a denitration catalyst. More particularly, in the denitration treatment, a denitration catalyst is contacted with an exhaust gas in the presence of a reducing agent such as ammonia and urea, and a nitrogen oxide in an exhaust gas is reduced to make harmless. The denitration treatment may be performed in a denitration apparatus which is provided in a normal exhaust gas system for denitration.

The denitration catalyst is not particularly limited, but the previously known denitration catalysts may be used. In a viewpoint of high resistance to mercury, a catalyst containing vanadium (V) and/or titanium (Ti) is preferable. A particularly preferable aspect of the catalyst containing vanadium (V) and/or titanium (Ti) will be explained in detail below.

It is preferable that the denitration catalyst also contains one or more transition metals selected from the group consisting of silicon (Si), zirconium (Zr), aluminum (Al), tungsten (W) and molybdenum (Mo), in addition to vanadium (V) and/or titanium (Ti). These transition metals may be contained as an independent metal oxide, but it is preferable that they are contained by formation of a composite oxide with titanium. That is, it is more preferable that the denitration catalyst contains a binary or ternary composite oxide of one kind or two kinds selected from the group consisting of silicon, zirconium, aluminum, tungsten and molybdenum, as well as titanium. Specifically, a binary composite oxide such as Ti—Si, Ti—Zr, Ti—Al, Ti—W, and Ti—Mo; a ternary composite oxide such as Ti—Si—Mo, Ti—Si—W, Ti—Si—Zr, Ti—Si—Al, Ti—Zr, Al, Ti—Zr—Mo, Ti—ZrW, Ti—Al—Mo, and Ti—W—Mo are preferable in that a stable structure can be maintained, and high resistance to mercury can be exerted. Among them, a binary or ternary composite oxide of a transition metal containing silicon (Si) as an essential component and titanium (Ti) such as a binary composite oxide such as Ti—Si, and a ternary composite oxide such as Ti—Si—Mo, Ti—Si—W, Ti—Si—Zr, and Ti—Si—Al is more preferable since denitration activity is higher. Herein, a composite oxide refers to an oxide not showing a clear inherent peak assignable to a substance other than $TiO_2$ and, regarding $TiO_2$, not showing an inherent peak assignable to anatase-type titanium oxide, or showing a broader diffraction peak than a diffraction peak of anatase-type titanium oxide if showing the peak, in a X-ray diffraction pattern.

When the denitration catalyst contains titanium composite oxide, a composition of each element in the titanium composite oxide is not particularly limited, but contents of elements (Si, Zr, Al, W, Mo etc.) other than titanium (Ti) occupied in a titanium composite oxide are preferably 0.5 to 30% by weight, more preferably 1 to 30% by weight, further preferably 1 to 25% by weight, respectively, as expressed by a weight ratio in terms of oxide of respective elements.

When the denitration catalyst contains titanium composite oxide, a method for preparing the titanium composite oxide is not particularly limited, but the previously known methods such as a precipitation method (coprecipitation method), a segmentation method and a kneading method can be adopted. For example, in the case of Ti—Si, a titanium composite oxide can be obtained by dispersing a silicon compound such as colloidal silica in an aqueous ammonia solution to obtain an aqueous solution (A), gradually adding an aqueous titanium compound solution dropwise to this aqueous solution (A) under stirring, filtering, washing and further drying the resulting slurry, and calcining this at an elevated temperature of 300 to 600° C. In addition, for example, in the case of Ti—Si—Mo, Ti—Si—Zr, Ti—Si—Al, or Ti—Si—W, a titanium composite oxide can be obtained by further adding an aqueous solution of a salt of Mo, Zr, Al or W to the aqueous solution (A), gradually adding an aqueous titanium compound solution dropwise to the resulting aqueous solution under stirring, filtering, washing and further drying the resulting slurry, and calcining this at an elevated temperature of 300 to 600° C.

When the denitration catalyst contains a titanium composite oxide, a source for supplying each element used upon preparation of the titanium composite compound is not particularly limited. Examples of a titanium (Ti) source, a silicon (Si) source, a zirconium (Zr) source, an aluminum (Al) source, a tungsten (W) source, and a molybdenum (Mo) source include the same sources as those described as a source for supplying each element used upon preparation of a Ti—V-containing catalyst in item of the first method for treating an exhaust gas.

Further, the denitration catalyst is preferably a catalyst in which vanadium (V) as an active species is added to the titanium composite oxide. In particular, when the titanium composite oxide is the Ti—Si binary composite oxide, the denitration catalyst is preferable a catalyst in which at least one kind of tungsten (W) and molybdenum (Mo) (hereinafter, abbreviated as "W.Mo") together with vanadium (V) is added as an active species in that denitration activity is higher.

When the denitration catalyst is a catalyst in which the active species (V, W, Mo) is added to the titanium composite oxide (when V is added to the titanium composite oxide, or when V and W.Mo are added to the Ti—Si binary composite oxide), a content of V or V and W.Mo is not particularly limited, but is preferably 0.1 to 25% by weight, more preferably 1 to 20% by weight relative to a total weight of a denitration catalyst, as expressed by a weight ratio in terms of oxide of each element (V, W, Mo).

When the denitration catalyst is a catalyst in which the active species (V, W, Mo) is added to the titanium composite oxide, a method of adding V or V and W.Mo to the titanium composite oxide is not particularly limited, but there is exemplified a method of adding an aqueous solution of an active species (one or more kinds of vanadium source, tungsten source and molybdenum source) to be added together with an organic or inorganic molding aid which is generally used upon molding of this species, to a powder of the titanium composite oxide, heating while stirring and kneading, to evaporate water into an extrudable paste, molding this into a honeycomb with an extrusion molding machine, and drying and calcining this at an elevated temperature (preferably 200 to 600° C.) in an air. Alternatively, as another method, a method of molding a powder of the titanium composite oxide into a shape such as a spherical or cylindrical pellet, or a lattice-like honeycomb in advance, calcining this, and impregnating this with an aqueous solution containing an active species source (one or more kinds of vanadium source, tungsten source and molybdenum source) to be added can be also adopted. Alternatively, preparation may be performed by a method of directly kneading a powder of the titanium composite oxide with a powder of oxide of an active species to be added (one or more kinds of vanadium oxide, tungsten oxide, and molybdenum oxide).

When the denitration catalyst is a catalyst in which the active species (V, W, Mo) is added to the titanium composite oxide, each source for supplying V, W or Mo is not particularly limited. Examples include those described as a source for supplying each element used upon preparation of a Ti—V-containing catalyst in item of the first method for treating an exhaust gas.

A shape of the denitration catalyst is the same as that of the Ti—V-containing catalyst described in item of the first method for treating an exhaust gas.

It is important that in the denitration catalyst, a total pore volume as measured by a mercury pressing method is 0.20 to 0.80 $cm^3/g$. By adopting a total pore volume of the denitration catalyst in the aforementioned range, even when an exhaust gas also containing mercury (metal mercury or mercury halide) is subjected to denitration treatment, accumulation of mercury which becomes a catalyst poison in a denitration catalyst can be suppressed, and better denitration performance can be maintained over a long term. A total pore volume of the denitration catalyst as measured by a mercury pressing method is preferably 0.25 to 0.75 cm$^3$/g, more preferably 0.30 to 0.60 cm$^3$/g.

A BET specific surface area of the denitration catalyst is the same as a BET specific surface area of a Ti—V-containing catalyst described in item of the aforementioned first method for treating an exhaust gas.

It is important that a treatment temperature in the denitration temperature, that is, a catalyst temperature of the denitration catalyst is a temperature higher than 300° C., that is, a temperature exceeding 300° C. Thereby, high denitration efficacy can be obtained. A catalyst temperature of the denitration catalyst is preferably 310 to 550° C., more preferably 310 to 500° C., further preferably 330 to 500° C.

A space velocity of an exhaust gas in the denitration treatment is not particularly limited, but is preferably 100 to 100000 Hr$^{-1}$, more preferably 200 to 50,000 Hr$^{-1}$.

The mercury halogenating treatment is specifically treatment of performing a reaction for changing metal mercury in an exhaust gas into mercury halide in the presence of a halogen compound (hereinafter, referred to as "mercury halogenating reaction" in some cases in item of the second method for treating an exhaust gas). Examples of the halogen compound include HCl and HBr. In the mercury halogenating reaction, metal mercury is converted into mercury chloride when the halogen compound is HCl, or is converted into mercury bromide when the halogen compound is HBr. For example, a reaction for converting into mercury chloride specifically shifts an equilibrium reaction shown by the aforementioned (1) equation towards right. Mercury halogenating treatment is performed by passing an exhaust gas through a mercury halogenating apparatus provided with a mercury halogenating catalyst.

In the mercury halogenating reaction, it is preferable that an amount of the halogen compound is not smaller than a stoichiometric amount, that is, 2 moles or more relative to 1 mole of metal mercury in an exhaust gas. Usually, a gaseous halogen compound is present in an exhaust gas in many cases. When an exhaust gas to be subjected to treatment contains a gaseous halogen compound at an amount in the aforementioned range, mercury halogenating treatment can be performed by passing an exhaust gas through a mercury halogenating apparatus provided with a mercury halogenating catalyst. On the other hand, when an exhaust gas to be subjected to treatment does not contain a gaseous halogen compound, or when the exhaust gas contains the gaseous halogen compound, but an amount of the compound is less than the aforementioned range, mercury halogenating treatment may be performed by passing an exhaust gas through a mercury halogenating apparatus provided with a mercury halogenating catalyst in the state where a halogen compound is supplied to the apparatus in a gas or liquid manner.

Preferable examples of the mercury halogenating catalyst include a catalyst in which an active species containing at least one kind of Pt, Ru, Rh, Pd, Ir, V, W, Mo, Ni, Co, Fe, Cr, Cu and Mn is added to one or more kinds selected from the group consisting of $TiO_2$, $SiO_2$, $ZrO_2$, $Al_2O_3$, $WO_3$, $MoO_3$, titanium composite oxide and zeolite (hereinafter, referred to as "metal oxides A").

It is preferable that the mercury halogenating catalyst is a catalyst in which a titanium composite oxide is used as the metal oxides A in that a stable structure can be maintained, and high resistance to mercury can be exerted. As the titanium composite oxide, a binary or ternary composite oxide of one kind or two kinds selected from the group consisting of silicon, zirconium, aluminum, tungsten and molybdenum, and titanium is preferable. Specifically examples include a binary composite oxide such as Ti—Si, Ti—Zr, Ti—Al, Ti—W, and Ti—Mo; a ternary composite oxide such as Ti—Si—Mo, Ti—Si—W, Ti—Si—Zr, Ti—Si—Al, Ti—Zr—Al, Ti—Zr—Mo, Ti—Zr—W, Ti—Al—Mo, and Ti—W—Mo. Among them, a binary or ternary composite oxide of a transition metal containing molybdenum (Mo) as an essential component and titanium (Ti) such as a binary composite oxide such as Ti—Mo, and a ternary composite oxide such as Ti—Si—Mo, Ti—Zr—Mo, Ti—Al—Mo, and Ti—W—Mo is more preferable since mercury halogenating activity is higher. Herein, a composite oxide refers to an oxide not showing a clear inherent peak assignable to a substance other than $TiO_2$ and, regarding $TiO_2$, not showing an inherent peak assignable to anatase—type titanium oxide, or showing a broader diffraction peak than a diffraction peak of anatase-type titanium oxide if shows the peak, in a X-ray diffraction pattern.

When the metal oxides A in the mercury halogenating catalyst is a titanium composite oxide, a composition of each element in the titanium composite oxide is not particularly limited. For example, contents of elements (Si, Zr, Al, W, Mo etc.) other than titanium (Ti) occupied in a titanium composite oxide are preferably 0.5 to 30% by weight, more preferably 1 to 30% by weight, further preferably 1 to 25% by weight, respectively, as expressed by a weight ratio in terms of oxide of each element.

When the metal oxides A in the mercury halogenating catalyst is a titanium composite oxide, a method for preparing the titanium composite oxide is not particularly limited, but the previously known methods such as a precipitation method (coprecipitation method), a sedimentation method and a kneading method can be adopted. For example, in the case of Ti—Mo, the titanium composite oxide can be obtained by dispersing a molybdenum compound such as ammonium paramolybdate and molybdic acid in an aqueous ammonia solution to obtain an aqueous solution (B), gradually adding an aqueous titanium compound solution dropwise to this aqueous solution (B) under stirring, filtering, washing and further drying the resulting slurry, and calcining this at an elevated temperature of 300 to 600° C. In addition, for example, in the case of Ti—Si—Mo, Ti—Zr—Mo, Ti—Al—Mo, or Ti—W—Mo, the titanium composite oxide can be obtained by adding an aqueous solution of a salt of Si, Zr, Al or W to the aqueous solution (B), gradually adding an aqueous titanium compound solution dropwise to the resulting aqueous solution under stirring, filtering, washing and further drying the resulting slurry, and calcining this at an elevated temperature of 300 to 600° C.

When the metal oxides A in the mercury halogenating catalyst is a titanium composite oxide, a source for supplying each element used upon preparation of the titanium composite oxide is not particularly limited. Examples of a titanium (Ti) source, a silicon (Si) source, a zirconium (Zr) source, an aluminum (Al) source, a tungsten (W) source and a molybdenum (Mo) source include the same sources as those described as a source for supplying each element used upon preparation of a Ti—V-containing catalyst in item of the first method for treating an exhaust gas.

In addition, it is particularly preferable that the mercury halogenating catalyst is a catalyst in which, among the aforementioned active species, vanadium (V) is added, in that resistance to mercury is high.

A content of the vanadium (V) in the mercury halogenating catalyst is not particularly limited, but is preferably 0.1 to 25% by weight, more preferably 1 to 20% by weight relative to a total amount of a mercury halogenating catalyst as expressed by a weight ratio in terms of an oxide.

When the mercury halogenating catalyst is a catalyst in which vanadium (V) is added to the metal oxides A, a method of adding vanadium (V) is not particularly limited. Examples include a method of adding an aqueous solution containing a vanadium source together with an organic or inorganic molding aid which is generally used upon this kind of molding to a powder of the metal oxides A, heating the materials to evaporate water while mixing and kneading, into an extrudable paste, molding this into a honeycomb with an extrusion molding machine, and drying and calcining this at an elevated temperature (preferably 200 to 600° C.) in an air. Alternatively, as another method, a method of molding a powder of the metal oxides A into a shape such as a cylindrical pellet, and a lattice-like honeycomb in advance, calcining this, and impregnating this with an aqueous solution containing a vanadium source can be also adopted. Alternatively, preparation may be performed by a method of directly kneading a powder of the metal oxides A with a metal of vanadium oxide.

When the mercury halogenating catalyst is a catalyst in which vanadium (V) is added to the metal oxides A, a vanadium source is not particularly limited, but examples include the same sources as those described as a source for supplying each element used upon preparation of a Ti—V-containing catalyst in the first method for treating an exhaust gas.

A shape of the mercury halogenating catalyst is the same as that of a Ti—V-containing catalyst described in item of the first method for treating an exhaust gas.

A total pore volume of the mercury halogenating catalyst is not particularly limited, but a total pore volume as measured by a mercury pressing method is preferably 0.20 to 0.80 $cm^3/g$, more preferably 0.25 to 0.80 $cm^3/g$, further preferably 0.25 to 0.70 $cm^3/g$. When a total pore volume of a mercury halogenating catalyst as measured by a mercury pressing method is smaller than 0.20 $cm^3/g$, diffusion of a gas into the interior of a catalyst becomes insufficient, a reaction of converting metal mercury into mercury halide can not effectively proceed and, as a result, effect of removing mercury is reduced. On the other hand, when a total pore volume of a mercury halogenating catalyst exceeds 0.80 $cm^3/g$, a mechanical strength of a catalyst is reduced, a shape is easily collapsed by slight impact, and use as a catalyst becomes impossible.

A BET specific surface area of the mercury halogenating catalyst is not particularly limited, but is preferably 20 to 400 $m^2/g$, more preferably 30 to 350 $m^2/g$.

It is important that a treating temperature in the mercury halogenating treatment, that is, a catalyst temperature of the mercury halogenating catalyst is 300° C. or lower. Thereby, a mercury halogenating reaction can effectively proceed. A catalyst temperature of the mercury halogenating catalyst is preferably 60 to 300° C., more preferably 100 to 300° C., further preferably 100 to 280° C.

A space velocity of an exhaust gas in the mercury halogenating treatment is not particularly limited, but is preferably 100 to 90,000 $Hr^{-1}$, more preferably 200 to 50,000 $Hr^{-1}$. When the velocity is smaller than 100 $Hr^{-1}$, a treating apparatus becomes too large, being inefficient. On the other hand, when the velocity exceeds 90,000 $Hr^{-1}$, effect of a reaction for converting into mercury halide is reduced.

In the second method according to the present invention for treating an exhaust gas, it is preferable that mercury halide produced by the mercury halogenating treatment is removed by capturing in an absorbing solution. Mercury halide is easily dissolved in an absorbing solution, and can be removed from an exhaust gas by dissolving in an absorbing solution. As the absorbing solution, the same absorbing solution as that described in item of the first method for treating an exhaust gas may be used.

[Third Method for Treating Exhaust Gas]:

In a third method according to the present invention for treating an exhaust gas, an exhaust gas containing a nitrogen oxide and metal mercury is first subjected to treatment of converting metal mercury into mercury halide using a mercury halogenating catalyst (hereinafter, referred to as "mercury halogenating treatment" in some cases in item of the third method for treating an exhaust gas), then, subjected to treatment of removing the mercury halide by capturing in an absorbing solution (hereinafter, referred to as "mercury removing treatment" in some cases in item of the third method for treating an exhaust gas) and thereafter, treatment of a nitrogen oxide using a denitration catalyst (hereinafter, referred to as "denitration treatment" in some cases in item of the third method for treating an exhaust gas). Each treatment will be explained detail below.

More particularly, mercury halogenating treatment is treatment of performing a reaction for changing metal mercury in an exhaust gas into mercury halide in the presence of a halogen compound (hereinafter, referred to as "mercury halogenating reaction" in some cases in term of the third method for treating an exhaust gas), and its treating temperature is not limited, as in the case of the mercury halogenating treatment described in term of the second method for treating an exhaust gas. That is, details of the mercury halogenating reaction, a halogen compound and an amount thereof, a mercury halogenating catalyst, and a space velocity of an exhaust gas are as described above.

A treatment temperature in the mercury halogenating treatment (catalyst temperature of the mercury halogenating catalyst) is preferably 60 to 450° C., more preferably 100 to 350° C., further preferably 100 to 300° C.

In mercury removing treatment, mercury halide produced by the mercury halogenating treatment is removed by capturing it in an absorbing solution. More particularly, utilizing the fact that mercury halide is easily dissolved in an absorbing solution, mercury halide is removed from an exhaust gas by dissolving in an absorbing solution.

As the absorbing solution used in the mercury removing treatment, for example, the same solution as that described in item of the first method for treating an exhaust gas may be used.

In denitration treatment, a nitrogen oxide in an exhaust gas is treated using a denitration catalyst. Specifically, in the denitration treatment, a nitrogen oxide in an exhaust gas is reduced to make harmless by contacting a denitration catalyst with an exhaust gas in the presence of a reducing agent such as ammonia and urea. In the third method according to the present invention for treating an exhaust gas, it is important that an exhaust gas which has been treated to the mercury removing treatment is subjected to the denitration treatment because, thereby, deterioration of a denitration catalyst is suppressed, and high denitration performance can be maintained for a long term. The denitration treatment may be performed in a denitration apparatus provided in a conventional exhaust gas system for denitration.

The denitration catalyst is not particularly limited, but the previously known denitration catalysts can be used. In respect of denitration activity, a catalyst containing vanadium (V) and/or titanium (Ti) is preferable as described in item of the second method for treating an exhaust gas. However, as to the denitration catalyst used in the third method for treating an exhaust gas, there is not especially such as limitation on the total pore volume or the usage temperature like in the second method for treating an exhaust gas, However, as to particularly preferred modes of the aforementioned catalyst containing vanadium (V) and/or titanium (Ti) (including the above total pore volume and usage temperature) (namely, such as shape and BET specific surface area of the denitration catalyst), it is needless to say that there is favorably adopted the modes described in item of the second method for treating an exhaust gas.

A total pore volume of the denitration catalyst is not particularly limited, but a total pore volume as measured by a mercury pressing method is preferably 0.20 to 0.80 cm$^3$/g, more preferably 0.25 to 0.75 cm$^3$/g, further preferably 0.30 to 0.60 cm$^3$/g.

A BET specific surface area of the denitration catalyst is favorably the same as a BET specific surface area of the denitration catalyst described in terms of the second method for treating an exhaust gas.

A treating temperature in the denitration treatment (catalyst temperature of the denitration catalyst) is preferably 150 to 550° C., more preferably 150 to 500° C., further preferably 150 to 400° C.

A space velocity of an exhaust gas in the denitration treatment is favorably the same as a space velocity of an exhaust gas in the denitration treatment described in the second method for treating an exhaust gas.

In the first, second and third exhaust gas treating methods according to the present invention, it is preferable to recover mercury (mercury halide) absorbed in an absorbing solution, and reuse the recovered mercury as a source. More particularly, for example, mercury can be recovered by heating an absorbing solution after absorption of mercury halide to generate a mercury vapor, and rapidly cooling this.

In the first, second and third exhaust gas treating methods according to the present invention, an exhaust gas to be subjected to treatment contains at least a nitrogen oxide and metal mercury, but for example, the exhaust gas may contain a component (compound) other than the nitrogen oxide and metal mercury, such as mercury halide.

In the first, second and third exhaust gas treating methods according to the present invention, a concentration of mercury (metal mercury and mercury halide) in an exhaust gas to be treated is preferably 100 mg/m$^3$N or smaller, more preferably 50 mg/m$^3$N or smaller, further preferably 40 mg/m$^3$N or smaller. Generally, when a concentration of a subject to be removed which is present in an exhaust gas is too small, removal effect is not sufficiently recognized in some cases. In the method according to the present invention for treating an exhaust gas, even at an extremely low concentration of mercury (metal mercury and mercury halide) such as 10 μg/m$^3$N or smaller, removal effect can be sufficiently exerted.

DETAILED DESCRIPTION OF THE PREFERRED EMBODIMENTS

Hereinafter, the present invention is more specifically illustrated by the following Examples of some preferred embodiments. However, the present invention is not limited to them in any way.

PRODUCTION EXAMPLE 1-1

Production of Ti—V-Containing Catalyst (1)

First, a Ti—Si—Mo composite oxide was prepared as follows: To a mixed solution of 6.7 kg of a silica sol ("SNOWTEX-30" manufactured by Nissan Chemical Industries, Ltd., containing 30 wt % in terms of SiO$_2$), 103 kg of industrial aqueous ammonia (containing 25 wt % NH$_3$), and 58 liter of water was added 2.25 kg of molybdic acid, and the mixture was stirred well to prepare a uniform solution. To this solution was gradually added 228 liter of a solution of titanyl sulfate in sulfuric acid (manufactured by Tayca Corporation: containing 70 g/liter as TiO$_2$, 287 g/liter as H$_2$SO$_4$) dropwise while stirring, to produce precipitates, and an appropriate amount of aqueous ammonia was added to adjust a pH to 4. This coprecipitated slurry was allowed to stand for about 40 hours, filtered, sufficiently washed with water, and dried at 150° C. for 1 hour. Further, this was calcined at 500° C. for 5 hours under air atmosphere to obtain a Ti—Si—Mo composite oxide powder. A composition of the Ti—Si—Mo composite oxide powder was titanium oxide:silicon oxide:molybdenum oxide=80:10:10 as expressed by a weight ratio in terms of oxide.

Then, vanadium was added to the Ti—Si—Mo composite oxide as follows: 1.29 kg of ammonium metavanadate, 1.67 kg of oxalic acid and 0.4 kg of monoethanolamine were mixed and dissolved in 8 liter of water, to prepare a uniform vanadium-containing solution. 19 kg of the Ti—Si—Mo composite oxide as described above was placed into a kneader, a total amount of the vanadium-containing solution together with a molding aid containing an organic binder (starch 1.5 kg) was added, and the mixture was stirred well. Further, the materials were mixed well with a blender while adding an appropriate amount of water, sufficiently kneaded with a continuous kneader, and extrusion-molded into a honeycomb. The resulting molded product was dried at 60° C., and calcined at 450° C. for 5 hours to obtain a Ti—V-containing catalyst (1).

A composition of the resulting Ti—V-containing catalyst (1) was Ti—Si—Mo composite oxide:vanadium oxide=95:5 (titanium oxide:silicon oxide:molybdenum oxide: vanadium oxide=76:9.5:9.5:5 as expressed by a weight ratio in terms of oxide) as expressed by a weight ratio in terms of oxide.

Figure 5:
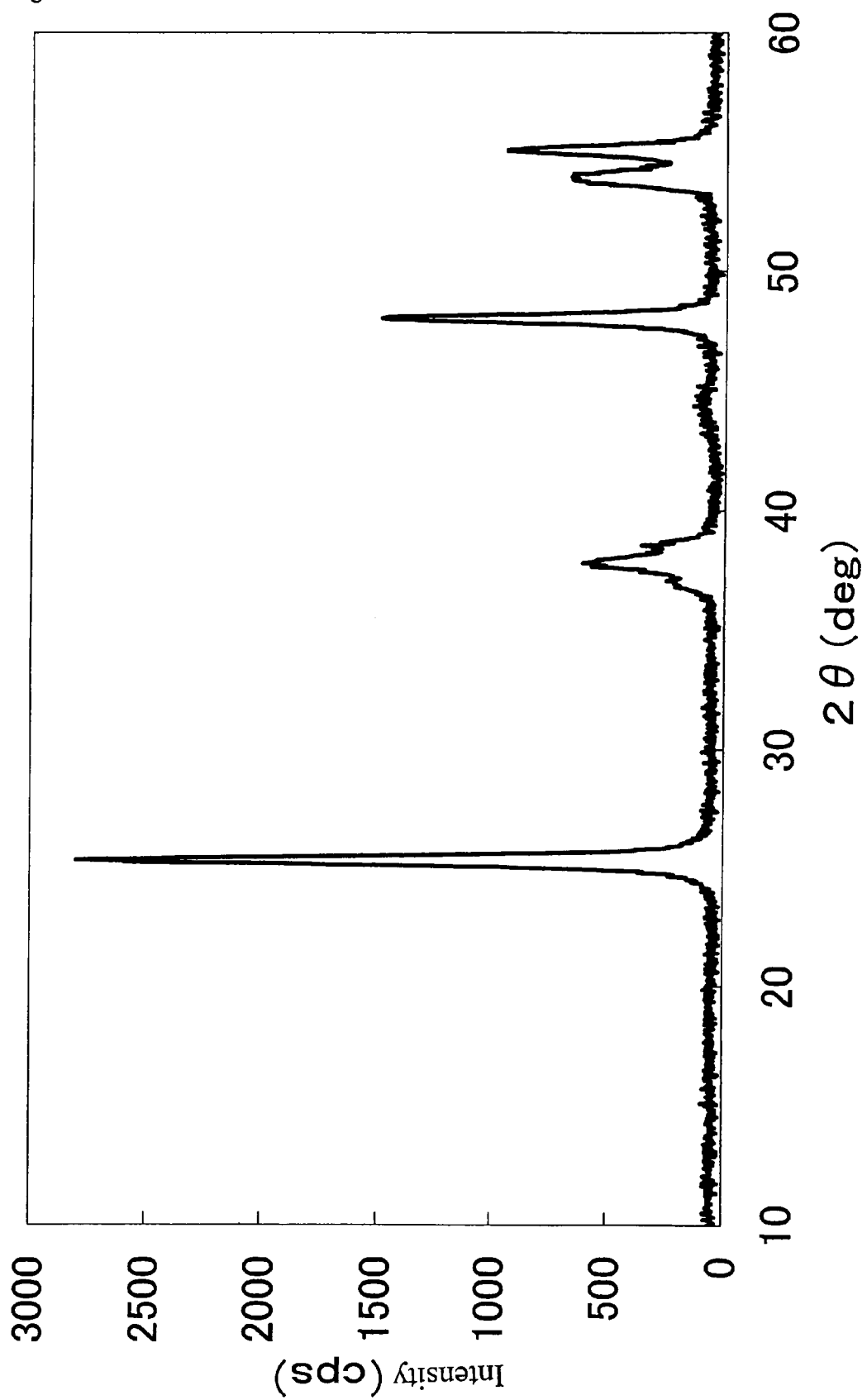
FIG. 5 is an X-ray diffraction pattern of $TiO_2$.

A X-ray diffraction pattern of the Ti—V-containing catalyst (1) is shown in FIG. 1. Since in FIG. 1, a clear inherent peak assignable to a substance other than TiO$_2$ was not recognized, and a broad peak assignable to anatase-type titanium oxide was recognized, it was confirmed that the Ti—V-containing catalyst (1) is a composite oxide. As a reference, a X-ray diffraction pattern of TiO$_2$ is shown in FIG. 5 (the FIG. 5 is referenced also in the following Production Examples).

PRODUCTION EXAMPLE 1-2

Production of Ti—V-Containing Catalyst (2)

First, a Ti—Mo composite oxide was prepared as follows: 1.6 kg of molybdic acid was added to a mixed solution of 120 kg of industrial aqueous ammonia (containing 25 wt % NH$_3$) and 140 liter of water, and the mixture was stirred well to completely dissolve molybdic acid, to prepare a uniform solution. To this solution was gradually added dropwise 266 liter of a solution of titanyl sulfate in sulfuric acid (manufactured by Tayca Corporation: 70 g/liter as TiO$_2$, 287 g/liter as H$_2$SO$_4$), to produce precipitates, and an appropriate amount of aqueous ammonia was added to adjust a pH to 4. This coprecipitated slurry was allowed to stand for about 40 hours, filtered, washed sufficiently with water and dried at 150° C. for 1 hour. Further, this was calcined at 500° C. for 5 hours under air atmosphere to obtain a Ti—Mo composite oxide powder. A composition of the Ti—Mo composite oxide powder was titanium oxide:molybdenum oxide=93:7 as expressed by a weight ratio in terms of oxide.

Then, vanadium was added to the Ti—Mo composite oxide as follows: 1.29 kg of ammonium metavanadate, 1.67 kg of oxalic acid and 0.4 kg of monoethanolamine were mixed and dissolved in 8 liter of water, to prepare a uniform vanadium-containing solution. 19 kg of the Ti—Mo composite oxide powder as obtained above was placed into a kneader, and a total amount of the vanadium-containing solution together with a molding aid containing an organic binder (starch 1.5 kg) was added, followed by sufficient stirring. Further, the materials were mixed well with a blender while adding an appropriate amount of water, sufficiently kneaded with a continuous kneader, and extrusion-molded into a honeycomb. The resulting molded product wad dried at 60° C., and calcined at 450° C. for 5 hours to obtain a Ti—V-containing catalyst (2).

A composition of the resulting Ti—V-containing catalyst (2) was Ti—Mo composite oxide: vanadium oxide=95:5 (titanium oxide:molybdenum oxide:vanadium oxide=88.4: 6.6:5 as expressed by a weight ratio in terms of oxide) as expressed by a weight ratio in terms of oxide.

Figure 2:
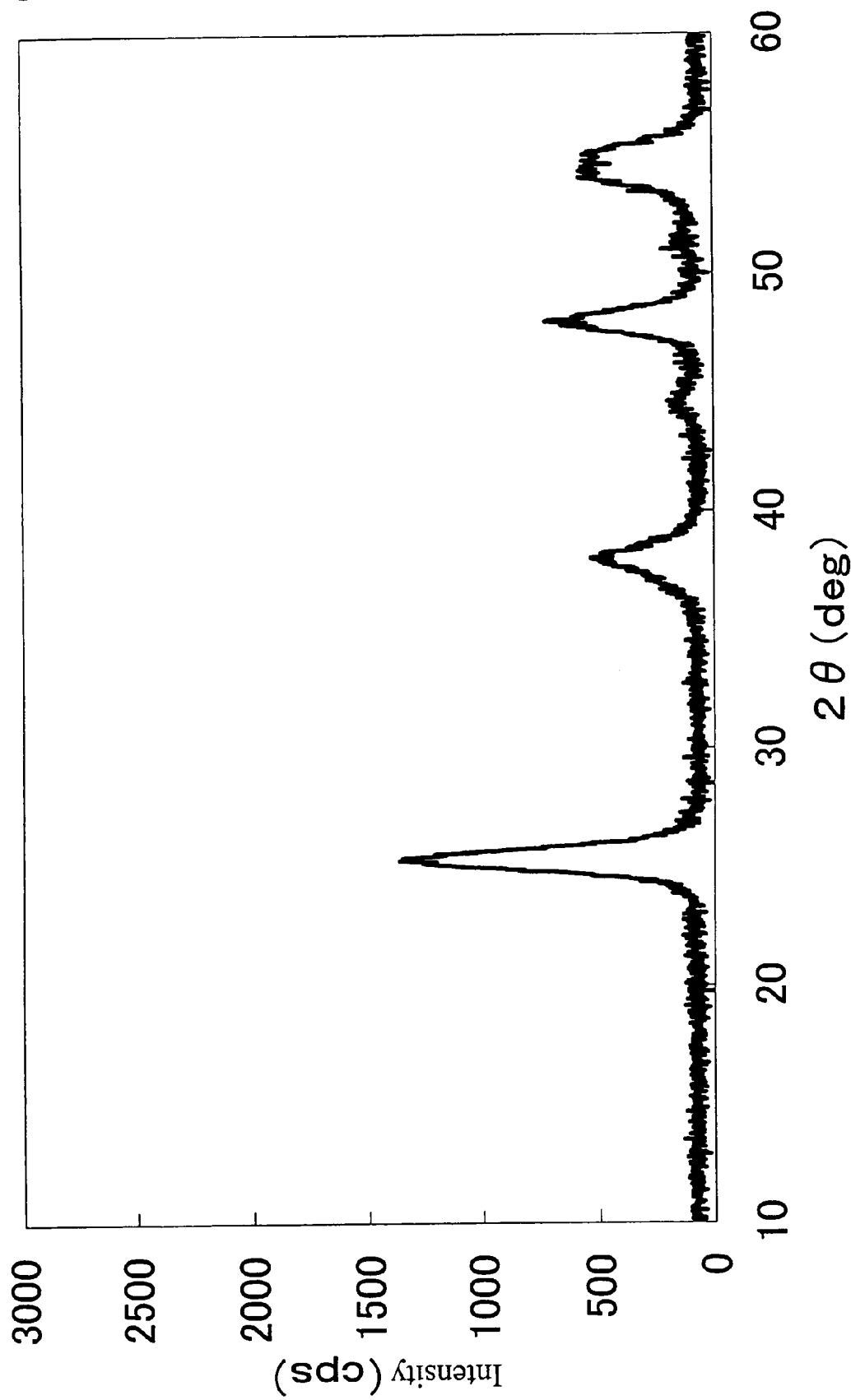
FIG. 2 is an X-ray diffraction pattern of a Ti—V-containing catalyst (2)

A X-ray diffraction pattern of the Ti—V-containing catalyst (2) is shown in FIG. 2. Since in FIG. 2, a clear inherent peak assignable to a substance other than $TiO_2$ was not recognized, and a broad peak assignable to anatase-type titanium oxide was recognized, it was confirmed that the Ti—V-containing catalyst (2) is a composite oxide.

PRODUCTION EXAMPLE 1-3

Production of Ti—V-Containing Catalyst (3)

First, a Ti—Si-composite oxide was prepared as follows: 10 kg of a silica sol ("SNOWTEX-30" manufactured by Nissan Chemical Industries, Ltd.; containing 30 wt % in terms of $SiO_2$), 104 kg of industrial aqueous ammonia (containing 25 wt % $NH_3$) and 73 liter of water were mixed, to prepare a uniform solution. To this solution was gradually added 243 liter of a solution of titanyl sulfate in sulfuric acid (manufactured by Tayca Corporation: containing 70 g/liter as $TiO_2$, 287 g/liter as $H_2SO_4$) dropwise while stirring. The resulting slurry was allowed to stand for 20 hours, filtered, washed sufficiency with water and dried at 150° C. for 1 hour. Further, this was calcined at 550° C. for 5 hours under air atmosphere to obtain a Ti—Si composite oxide powder. A composition of the Ti—Si-composite oxide powder was titanium oxide:silicon oxide=85:15 as expressed by a weight ratio in terms of oxide.

Then, vanadium and tungsten were added to the Ti—Si composite oxide as follows: 1.29 kg of ammonium metavanadate, 1.12 kg of ammonium paratungstate, 1.67 kg of oxalic acid and 0.85 kg of monoethanolamine were mixed and dissolved in 8 liter of water, to prepare a uniform vanadium and tungsten-containing solution. 18 kg of the Ti—Si composite oxide powder as obtained above was placed into a kneader, a total amount of the vanadium and tungsten-containing solution together with a molding aid containing an organic binder (starch 1.5 kg) was added, and the mixture was stirred well. Further, the materials were mixed well with a blender while adding an appropriate amount of water, sufficiently kneaded with a continuous kneader and extrusion-molded into a honeycomb. The resulting molding product was dried at 60° C., and calcined at 450° C. for 5 hours to obtain a Ti—V-containing catalyst (3).

A composition of the resulting Ti—V-containing catalyst (3) was Ti—Si composite oxide: vanadium oxide: tungsten oxide=90:5:5 (titanium oxide: silicon oxide: vanadium oxide: tungsten oxide=76.5:13.5:5:5 as expressed by a weight ratio in terms of oxide) as expressed by a weight ratio in terms of oxide.

Figure 3:
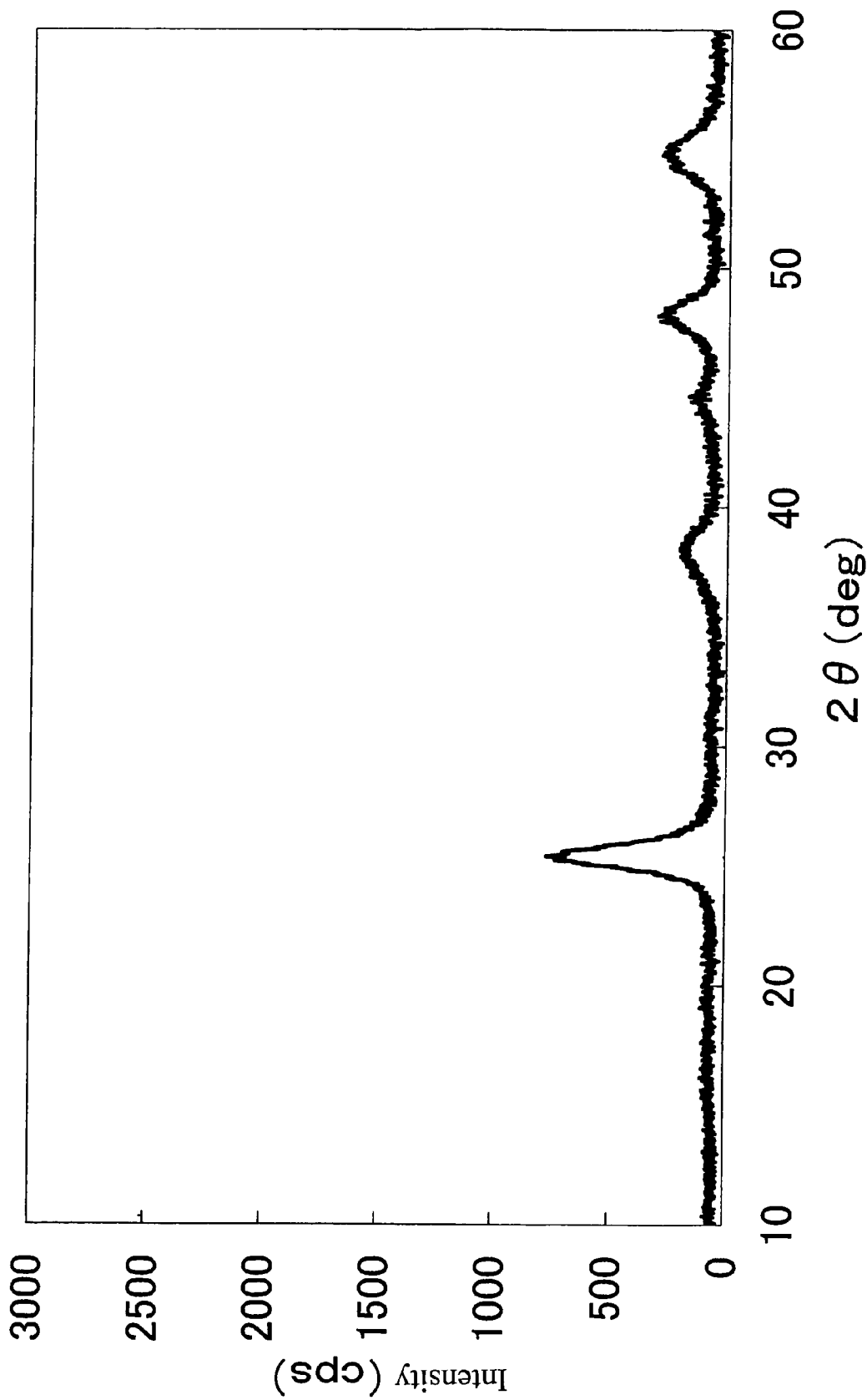
FIG. 3 is an X-ray diffraction pattern of a Ti—V-containing catalyst (3)

A X-ray diffraction pattern of the Ti—V-containing catalyst (3) is shown in FIG. 3. Since in FIG. 3, a clear inherent peak assignable to a substance other than $TiO_2$ was not recognized, and a broad peak assignable to anatase-type titanium oxide was recognized, it was confirmed that the Ti—V-containing catalyst (3) is a composite oxide.

PRODUCTION EXAMPLE 1-4

Production of Ti—V-Containing Catalyst (4)

Vanadium was added to the Ti—Si composite oxide obtained as in Production Example 1-3 as follows: 1.29 kg of ammonium metavanadate, 1.67 kg of oxalic acid, and 0.4 kg of monoethanolamine were mixed and dissolved in 8 liter of water, to prepare a uniform vanadium-containing solution. 19 kg of the Ti—Si composite oxide powder obtained as in Production Example 3 was placed into a kneader, and a total amount of the vanadium-containing solution together with a molding aid containing an organic binder (starch 1.5 kg) was added, followed by sufficient stirring. Further, the materials were mixed well with a blender while adding an appropriate amount of water, sufficiently kneaded with a continuous kneader, and extrusion-molded into a honeycomb. The resulting molded product was dried at 60° C., and calcined at 500° C. for 5 hours to obtain a Ti—V-containing catalyst (4).

A composition of the resulting Ti—V-containing catalyst (4) was Ti—Si composite oxide: vanadium oxide=95:5 (titanium oxide: silicon oxide: vanadium oxide=80.75: 14.25:5 as expressed by a weigh ratio in terms of oxide) as expressed by a weight ratio in terms of oxide.

Figure 4:
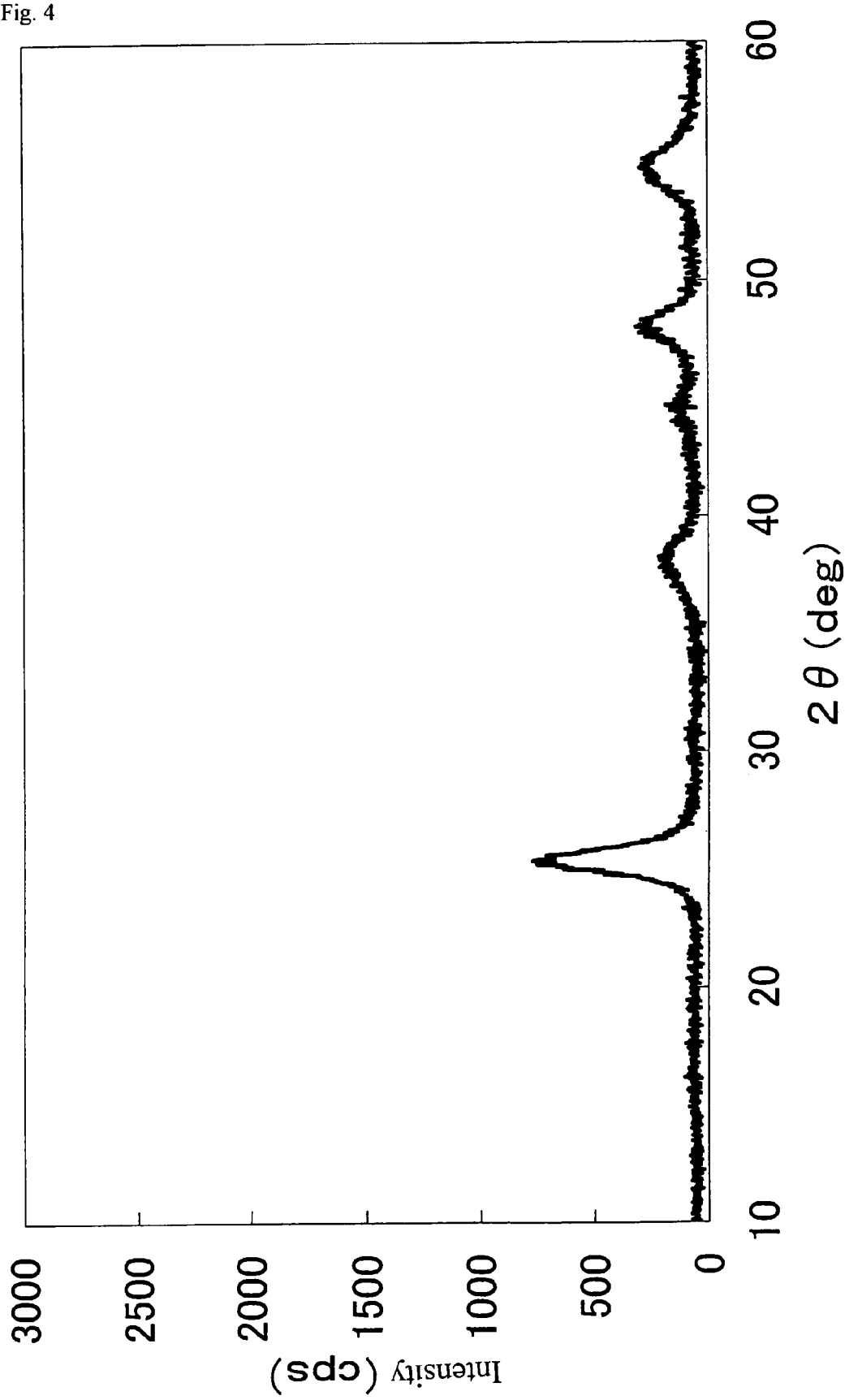
FIG. 4 is an X-ray diffraction pattern of a Ti—V-containing catalyst (4)

A X-ray diffraction pattern of the Ti—V-containing catalyst (4) is shown in FIG. 4. Since in FIG. 4, a clear inherent peak assignable to a substance other than $TiO_2$ was not recognized, and a broad peak assignable to anatase-type titanium oxide was recognized, it was confirmed that the Ti—V-containing catalyst (4) is a composite oxide.

COMPARATIVE PRODUCTION EXAMPLE 1-1

Production of Catalyst (C1)

According to the same manner as that of Production Example 1-4 except that commercially available $\gamma$-$Al_2O_3$ was used in place of the Ti—Si composite oxide in Production Example 1-4, a catalyst (C1) for comparison was obtained.

A composition of the resulting catalyst (C1) was $Al_2O_3$: $V_2O_5$=95:5 as expressed by a weight ratio in terms of oxide.

EXAMPLE 1-1

Figure 6:
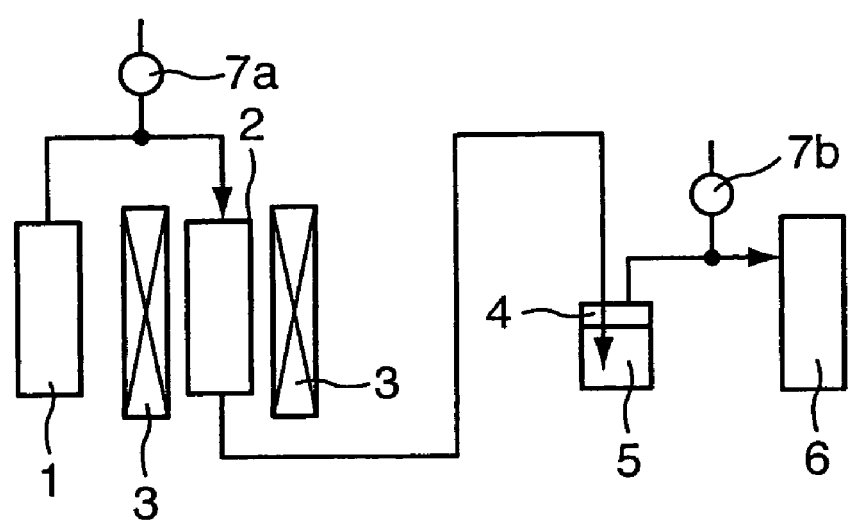
FIG. 6 is a schematic view of an exhaust gas treating system used in Examples 1-1 to 1-4 according to the present invention and Comparative Example 1-1.

In an exhaust gas treating system shown in FIG. 6, denitration and a mercury halogenating reaction were performed using a Ti—V-containing catalyst (1) at one-stage (in one catalyst apparatus), to treat a mimic exhaust gas having the following gas composition. Treating condition in a catalyst apparatus 2 was a space velocity of 7000 $Hr^{-1}$ and a catalyst temperature of 240° C.

[Gas Composition]:
NOx: 200 ppm
$NH_3$: 200 ppm
HCl: 4 ppm
Hg: 25 $\mu g/m^3 N$ (of this, metal mercury ($Hg^0$) is 15 $\mu g/m^3 N$)
$O_2$: 11%
$H_2O$: 9%

More particularly, first, a mimic exhaust gas placed into an exhaust gas container 1 was introduced into a catalyst apparatus 2 provided with a Ti—V-containing catalyst (1), and treatment was performed in the apparatus under the aforementioned treating condition. Thereupon, a catalyst temperature of the catalyst apparatus 2 was controlled by a temperature controlling apparatus 3. A mimic exhaust gas which had passed through the catalyst apparatus 2 was introduced in an absorbing solution (3% aqueous calcium carbonate solution) 5 in an absorbing bottle 4, and recovered in a recovering bottle 6.

And, 20 hours and 1000 hours after initiation of treatment, a gas a before treatment which was collected from a gas sampling port 7a disposed between the exhaust gas container 1 and the catalyst apparatus 2, and a gas b after treatment which was collected from a gas sampling port 7b disposed between the absorbing bottle 4 and the recovering bottle 6 were measured for a concentration of NOx and a concentration of Hg ($Hg^0$ and $HgCl_2$) contained in each gas, and a denitration rate and a mercury removal rate were obtained according to the following equation. Results are shown in Table 1.

<Denitration Rate>:

Denitration rate (%)={(NOx concentration of gas a)−(NOx concentration of gas b)}÷(NOx concentration of gas a)×100

<Mercury Removal Rate>:

Mercury removal rate (%)={(Hg concentration of gas a)−(Hg concentration of gas b)}÷(Hg concentration of gas a)×100

EXAMPLES 1-2 TO 1-4 AND COMPARATIVE EXAMPLE 1-1

According to the same manner as that of Example 1-1 except that each catalyst shown in Table 1 was used in place of the Ti—V-containing catalyst (1), the same mimic exhaust gas as that of Example 1-1 was treated. And, a denitration rate and a mercury removal rate were obtained as in Example 1-1. Results are shown in Table 1.

EXAMPLES 1-5

Figure 7:
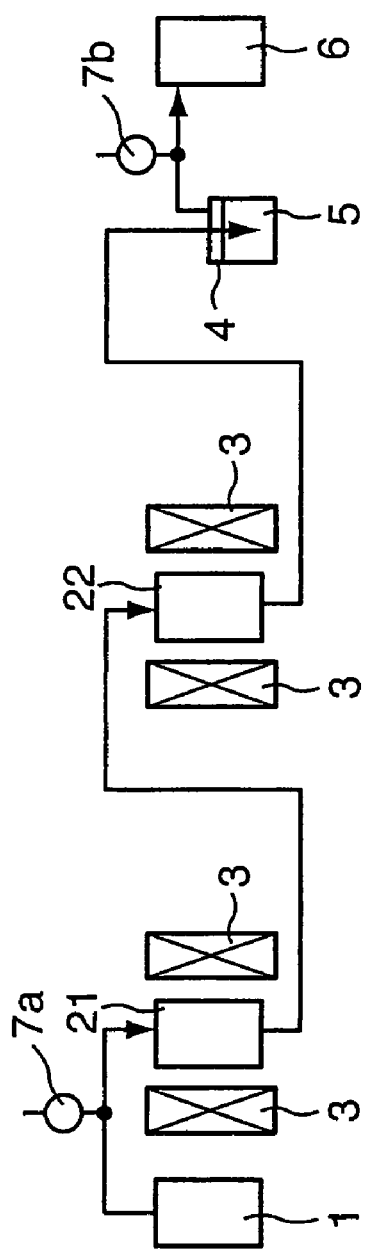
FIG. 7 is a schematic view of an exhaust gas treating system used in Examples 1-5 and 1-6 according to the present invention.

In an exhaust gas treating system shown in FIG. 7, denitration and a mercury halogenating reaction were performed using Ti—V-containing catalyst (1) at a two-stage (in two catalyst apparatuses), to treat the same mimic exhaust gas as that of Example 1-1. Treating condition in a first stage catalyst apparatus 21 was a space velocity of 25000 $Hr^{-1}$ and a catalyst temperature of 240° C., and treating condition at a second stage catalyst apparatus 22 was a space velocity of 10000 $Hr^{-1}$ and a catalyst temperature of 150° C.

More particularly, first, a mimic exhaust gas placed into an exhaust gas container 1 was introduced into a first stage catalyst apparatus 21 provided with a Ti—V-containing catalyst (1), and treatment was performed in the apparatus under the first stage treating condition. Then, a mimic exhaust gas was introduced into a second stage catalyst apparatus 22 provided with a Ti—V-containing catalyst (1) from the first stage catalyst apparatus 21, and treatment was performed in the apparatus under the second stage treating condition. Thereupon, each catalyst temperature of the catalyst apparatus 21 and the catalyst apparatus 22 was controlled by a temperature controlling apparatus 3. A mimic exhaust gas which had passed through the second stage catalyst apparatus 22 was introduced into an absorbing solution (3% aqueous calcium carbonate solution) 5 in an absorbing bottle 4, and recovered in a recovering a bottle 6.

And, 20 hours and 1000 hours after initiation of treatment, a gas a before treatment which was collected from a gas sampling port 7a disposed between an exhaust gas container 1 and the catalyst apparatus 21, and a gas b after treatment which was collected from a gas sampling port 7b disposed between the absorbing bottle 4 and the recovering bottle 6 were measured for a concentration of NOx and a concentration of Hg ($Hg^0$ and $HgCl_2$) obtained in each gas, and a denitration rate and a mercury removal rate were obtained as in Example 1-1. Results are shown in Table 1.

EXAMPLE 1-6

According to the same manner as that of Example 1-5 except that treating condition at the first stage catalyst apparatus 21 was a space velocity of 10000 $Hr^{-1}$ and a catalyst temperature of 150° C., and treating condition at the second stage catalyst apparatus 22 was a space velocity of 25000 $Hr^{-1}$ and a catalyst temperature of 240° C., the same mimic exhaust gas as that of Example 1-5 was treated. And, a denitration rate and a mercury removal rate were obtained as in Example 1-5.

Results are shown in Table 1.

TABLE 1

|  | Catalyst used | Number of stages | Denitration rate (%) | | Mercury removal rate (%) | |
| --- | --- | --- | --- | --- | --- | --- |
|  |  |  | After 20 hours | After 1000 hours | After 20 hours | After 1000 hours |
| Example 1-1 | Ti-V-containing catalyst (1) | 1 stage | 99.4 | 99.3 | 91.0 | 90.3 |
| Example 1-2 | Ti-V-containing catalyst (2) | 1 stage | 99.2 | 98.4 | 90.1 | 86.0 |
| Example 1-3 | Ti-V-containing catalyst (3) | 1 stage | 98.1 | 96.6 | 86.5 | 81.8 |

TABLE 1-continued

|  | Catalyst used | Number of stages | Denitration rate (%) | | Mercury removal rate (%) | |
|---|---|---|---|---|---|---|
|  |  |  | After 20 hours | After 1000 hours | After 20 hours | After 1000 hours |
| Example 1-4 | Ti-V-containing catalyst (4) | 1 stage | 97.6 | 95.0 | 82.1 | 74.7 |
| Example 1-5 | Ti-V-containing catalyst (1) | 2 stages | 98.3 | 96.8 | 89.0 | 84.7 |
| Example 1-6 | Ti-V-containing catalyst (1) | 2 stages | 98.2 | 95.9 | 88.0 | 81.7 |
| Comparative Example 1-1 | Catalyst (C1) | 1 stage | 81.8 | 69.6 | 65.0 | 52.0 |

PRODUCTION EXAMPLE 2-1

Production of Denitration Catalyst (1)

The Ti—V-containing catalyst (3) obtained in Production Example 1-3 was used as a denitration catalyst (1)).

PRODUCTION EXAMPLE 2-2

Production of Denitration Catalyst (2)

According to the same manner as that of Production Example 2-1 except that, after a Ti—Si composite oxide was obtained as in Production Example 2-1, 1.23 kg of ammonium paramolybdate was used in place of 1.12 kg of ammonium paratungstate, a denitration catalyst (2) was obtained in which vanadium and molybdenum were added to the Ti—Si composite oxide.

A composition of the resulting denitration catalyst (2) was Ti—Si composite oxide: vanadium oxide: molybdenum oxide=90:5:5 (titanium oxide: silicon oxide vanadium oxide:molybdenum oxide=76.5:13.5:5:5 as expressed by a weight ratio in terms of oxide) as expressed by a weight ratio in terms of oxide, and a total pore volume as measured by a mercury pressing method was 0.44 cm$^3$/g.

Figure 8:
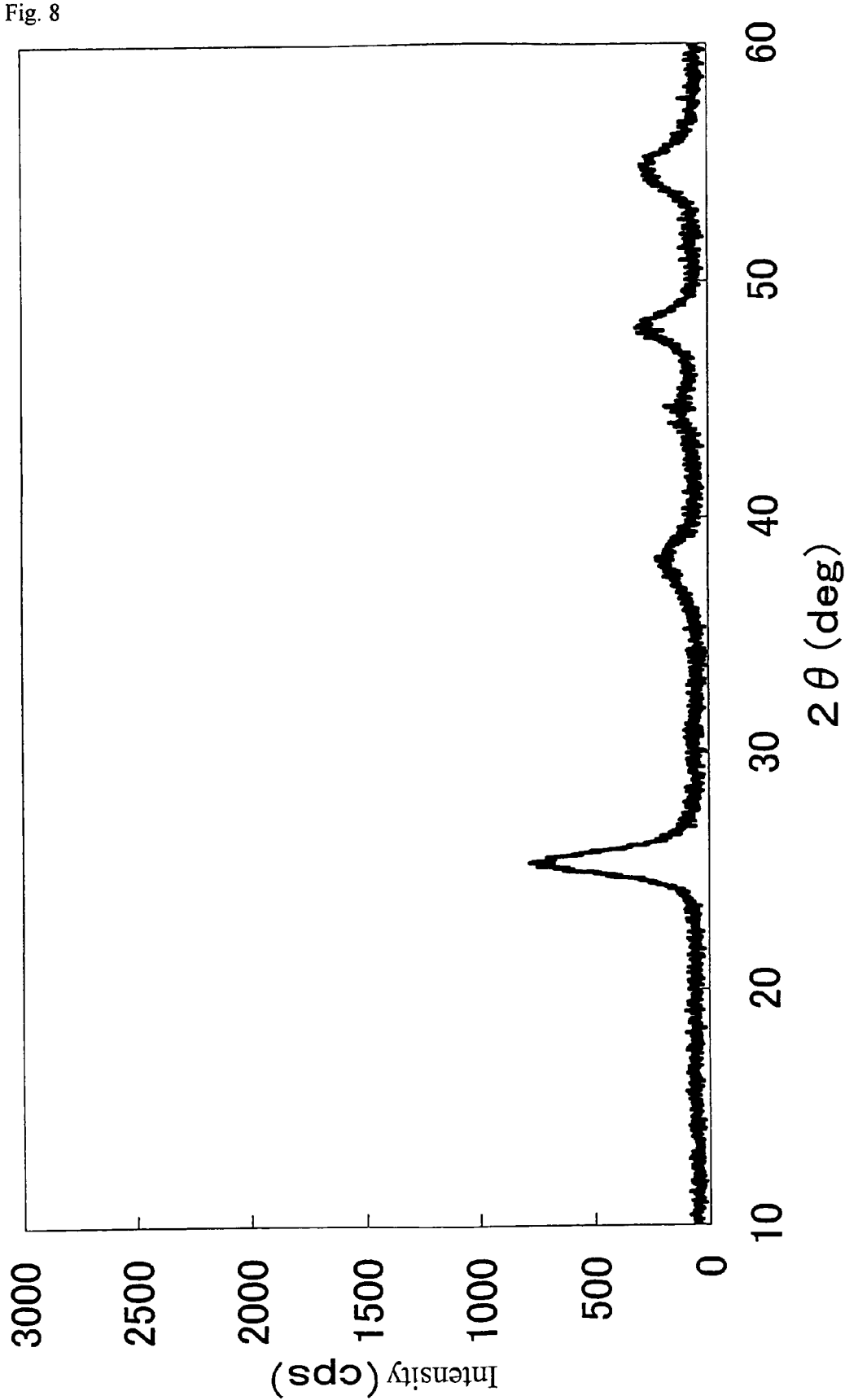
FIG. 8 is an X-ray diffraction pattern of a denitration catalyst (2)

A X-ray diffraction pattern of a denitration catalyst (2) is shown in FIG. 8. Since in FIG. 8, a clear inherent peak assignable to a substance other that TiO$_2$ was not recognized, and a broad peak assignable to anatase-type titanium oxide was recognized, it was confirmed that the denitration catalyst (2) is a composite oxide.

PRODUCTION EXAMPLE 2-3

Production of Denitration Catalyst (3)

Vanadium and tungsten were added to a commercially available titanium oxide powder as follows: 1.29 kg of ammonium metavanadate, 1.12 kg of ammonium paratungstate, 1.67 kg of oxalic acid, and 0.85 kg of monoethanolamine were mixed and dissolved in 8 liter of water, to prepare a uniform vanadium and tungsten-containing solution. 18 kg of a commercially available titanium oxide powder ("DT-51", manufactured by Millennium Inorganic Chemicals Limited) was placed into a kneader, and a total amount of the vanadium and tungsten-containing solution together with a molding aid containing an organic binder (starch 1.5 kg) was added, followed by sufficient starring.

Further, the materials were mixed well with a blender while adding an appropriate amount of water, sufficiently kneaded with a continuous kneader and extrusion-moldered into a honeycomb. The resulting molded product was dried at 60° C., and calcined at 450° C. for 5 hours to obtain a denitration catalyst (3).

A composition of the resulting denitration catalyst (3) was titanium oxide: vanadium oxide: tungsten oxide=90:5:5 as expressed by a weight ratio in terms of oxide, and a total pore volume as measured by a mercury pressing method was 0.13 cm$^3$/g.

Figure 9:
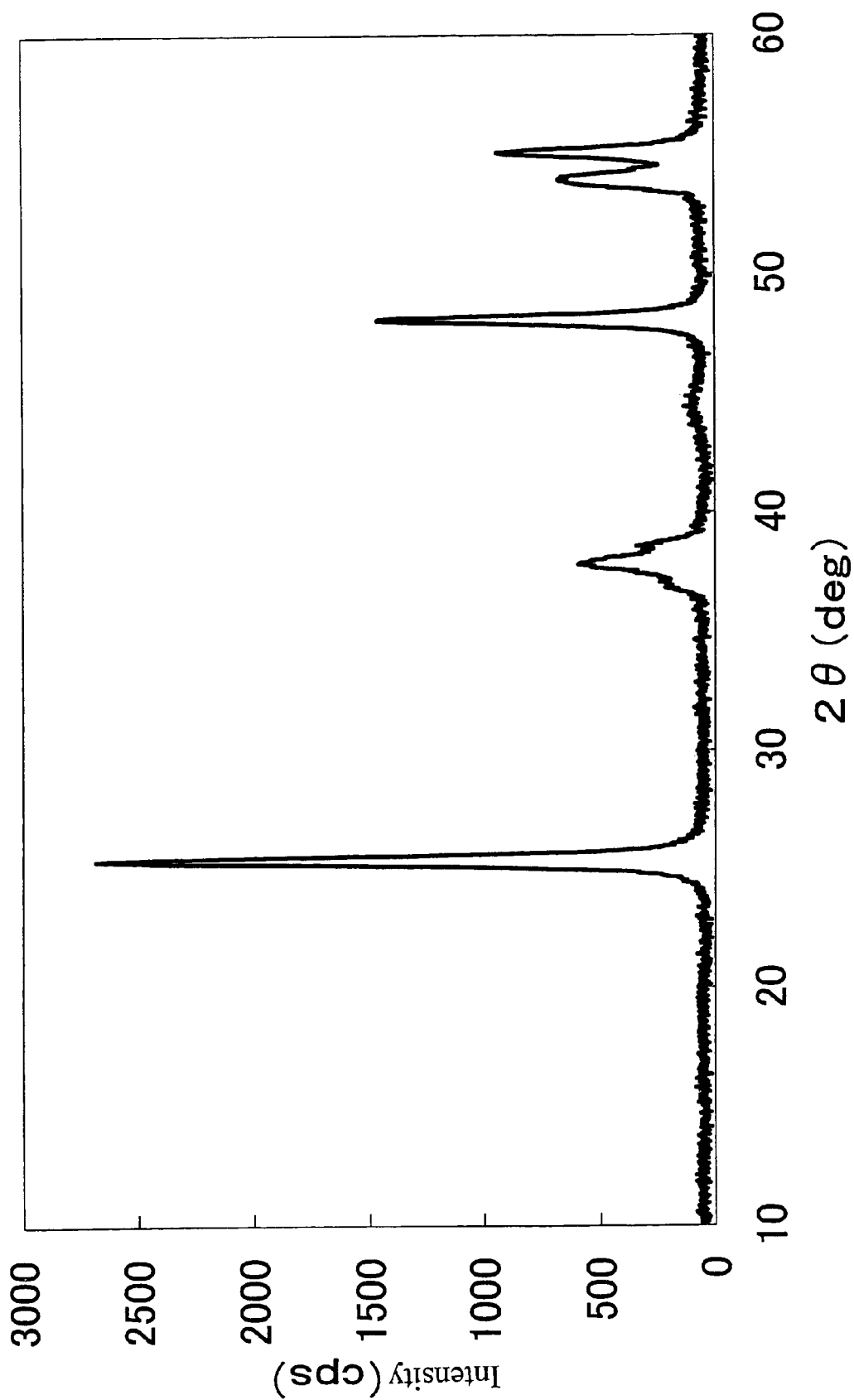
FIG. 9 is an X-ray diffraction pattern of a denitration catalyst (3)

A X-ray diffraction pattern of the denitration catalyst (3) is shown in FIG. 9. Since in FIG. 9, a clear inherent peak assignable to a substance other than TiO$_2$ was not recognized, and a sharp peak assignable to anatase-type titanium oxide was recognized, it was confirmed that the denitration catalyst (3) includes a titanium simple oxide as a main component.

PRODUCTION EXAMPLE 2-4

Production of Mercury Halogenating Catalyst (1)

First, a Ti—W composite oxide was prepared as follows: 20 kg of an aqueous ammonium metatungstate (manufactured by Nippon Inorganic Colour & Chemical Co., Ltd.: containing 50 wt % as WO$_3$) solution was added to a mixed solution of 255 kg of industrial aqueous ammonia (containing 25 wt % NH$_3$) and 140 liter of water, and the mixture was stirred well to prepare a uniform solution. To this solution was added gradually 571 liter of a solution of titanyl sulfate in sulfuric acid (manufactured by Tayca Corporation: containing 70 g/liter as TiO$_2$ and 287 g/liter as H$_2$SO$_4$) dropwise while stirring, to produce precipitates, and an appropriate amount of aqueous ammonia was added to adjust a pH to 4. This coprecipitated slurry was allowed to stand for about 40 hours, filtered, sufficiently washed with water, and dried at 150° C. for 1 hour. Further, calcining at 500° C. for 5 hours under air atmosphere afforded a Ti—W composite oxide powder. A composition of the Ti—W composite powder was titanium oxide:tungsten oxide=80:20 as expressed by a weight ratio in terms of oxide.

Then, vanadium was added to the Ti—W composite oxide as follows: 1.29 kg of ammonium metavanadate, 1.67 kg of oxalic acid, and 0.4 kg of monoethanolamine were mixed and dissolved in 8 liter of water, to prepare a uniform vanadium-containing solution. 19 kg of the Ti—W composite oxide powder as obtained above was placed into a kneader, and a total amount of the vanadium-containing solution together with a molding aid containing an organic binder (starch 1.5 kg) was added, followed by sufficient starring. Further, the materials were mixed well with a blender while adding an appropriate amount of water, sufficiently kneaded with a continuous kneader, and extrusion-molded into a honeycomb. The resulting molding product was dried at 60° C., and calcined at 450° C. for 5 hours to obtain a mercury halogenating catalyst (1).

A composition of the resulting mercury halogenating catalyst (1) was Ti—W composite oxide: vanadium oxide=95:5 (titanium oxide: tungsten oxide vanadium oxide=76:19:5 as expressed by a weight ratio in terms of oxide) as expressed by a weight ratio in terms of oxide.

Figure 10:
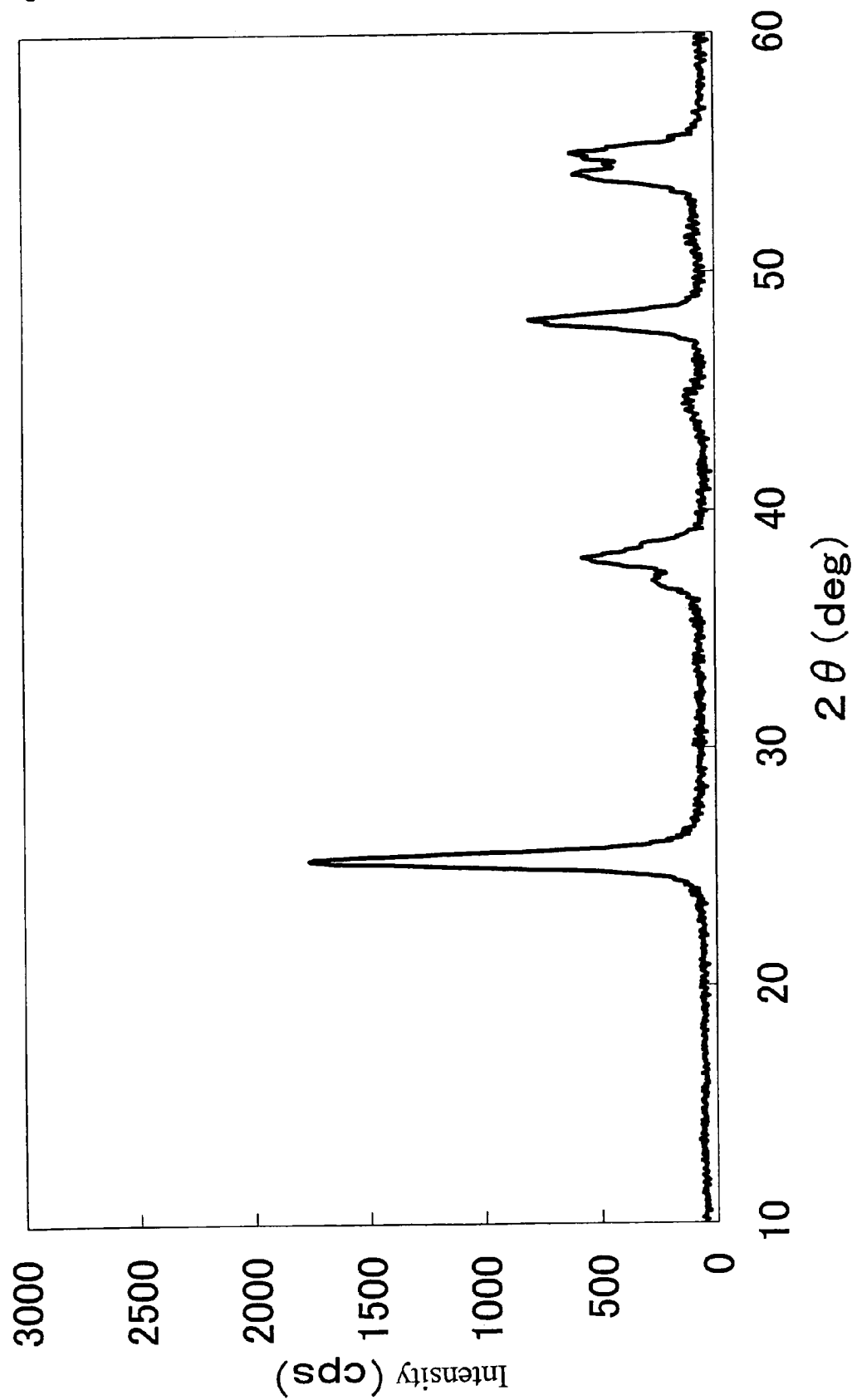
FIG. 10 is an X-ray diffraction pattern of a mercury halogenating catalyst (1)

A X-ray diffraction pattern of the mercury halogenating catalyst (1) is shown in FIG. 10. Since in FIG. 10, a clear inherent peak assignable to a substance other than $TiO_2$ was not recognized, and a broad peak assignable to anatase-type titanium oxide was recognized, it was confirmed that the mercury halogenating catalyst (1) is a composite oxide.

PRODUCTION EXAMPLE 2-5

Production of Mercury Halogenating Catalyst (2)

First, a Ti—Si—Mo composite oxide was prepared as follows: 3.4 kg of molybdic acid was added to a mixed solution of 3.3 kg of a silica sol ("SNOWTEX-30" manufactured by Nissan Chemical Industries, Ltd.; containing 30 wt % in terms of $SiO_2$), 103 kg of industrial aqueous ammonia (containing 25 wt % $NH_3$) and 58 liter of water, and the mixture was stirred well to prepare a uniform solution. To this solution was gradually added 228 liter of a solution of titanyl sulfate in sulfuric acid (manufactured by Tayca Corporation: containing 70 g/liter as $TiO_2$, 287 g/liter as $H_2SO_4$) dropwise while stirring, to produce to precipitates, and an appropriate amount of aqueous ammonia was added to adjust a pH to 4. This coprecipitated slurry was allowed to stand for about 40 hours, filtered, washed sufficiently with water, and dried at 100° C. for 1 hour. Further, this was calcined at 500° C. for 5 hours under air atmosphere to obtain a Ti—Si—Mo composite oxide powder. A composition of the Ti—Si—Mo composite oxide powder was titanium oxide: silicon oxide: molybdenum oxide=80:5:15 as expressed by a weight ratio in terms of oxide.

Then, vanadium was added to the Ti—Si—Mo composite oxide as follows: 1.29 kg of ammonium metavanadate, 1.67 kg of oxalic acid and 0.4 kg of monoethanolamine were mixed and dissolved in 8 liter of water, to prepare a uniform vanadium-containing solution. 19 kg of the Ti—Si—Mo composite oxide powder as obtained above was placed into a kneader, and a total amount of the vanadium-containing solution together with a molding aid containing an organic binder (starch 1.5 kg) was added, followed by sufficient stirring. Further, the materials were mixed well with a blender while adding an appropriate amount of water, kneaded sufficiently with a continuous kneader, and extrusion-molded into a honeycomb. The resulting molded product was dried at 60° C., and calcined at 450° C. for 5 hours to obtain a mercury halogenating catalyst (2).

A composition of the resulting mercury halogenating catalyst (2) was Ti—Si—Mo composite oxide:vanadium oxide=95:5 (titanium oxide: silicon oxide: molybdenum oxide: vanadium oxide=76:4.8:14.2:5 as expressed by a weight ratio in terms of oxide) as expressed by a weight ratio in terms of oxide.

Figure 11:
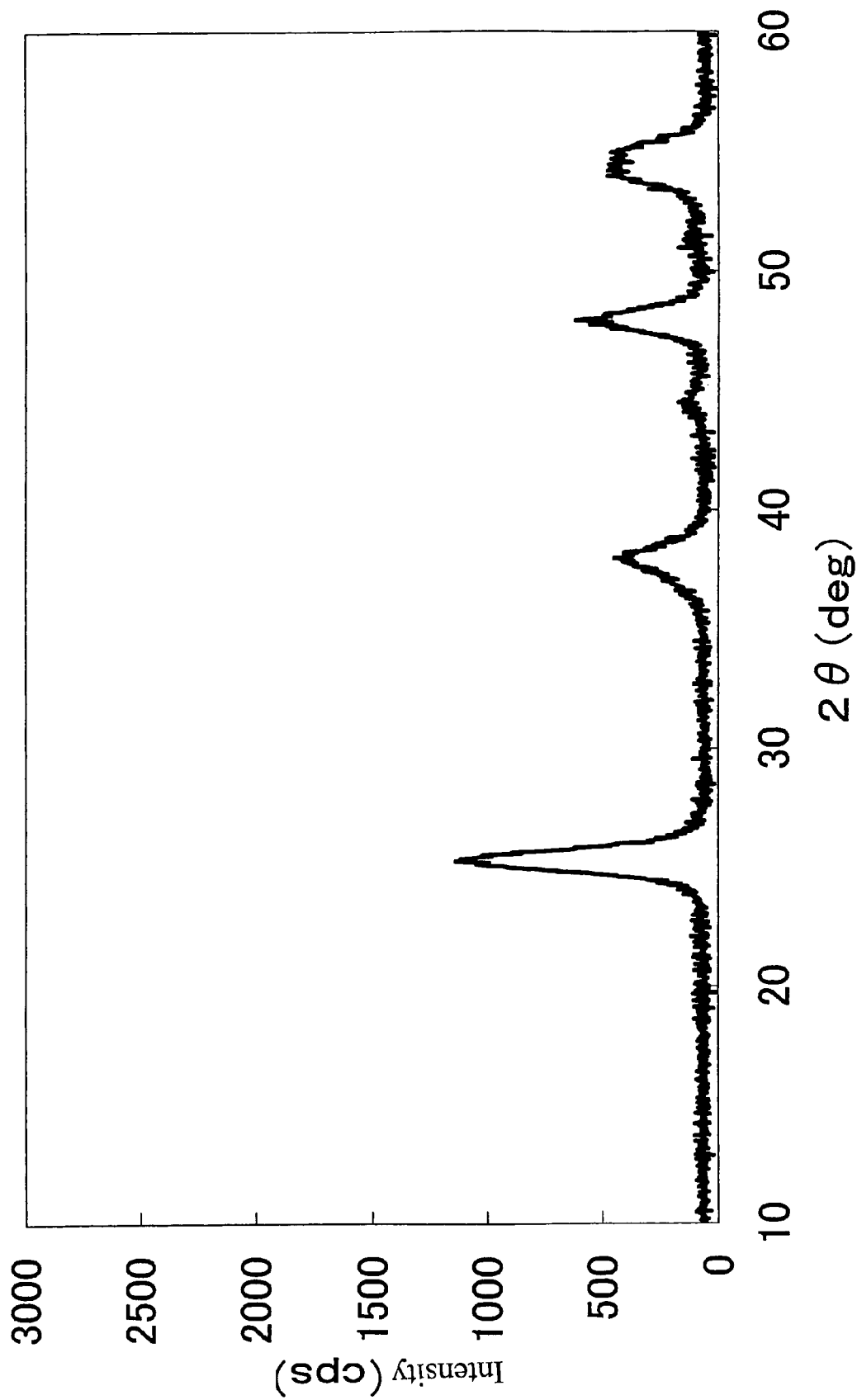
FIG. 11 is an X-ray diffraction pattern of a mercury halogenating catalyst (2)

A X-ray diffraction pattern of the mercury halogenating catalyst (2) is shown in FIG. 11. Since in FIG. 11, a clear inherent peak assignable to a substance other than $TiO_2$ was not recognized, and a broad peak assignable to anatase-type titanium oxide was recognized, it was confirmed that the mercury halogenating catalyst (2) is a composite oxide.

PRODUCTION EXAMPLE 2-6

Production of Mercury Halogenating Catalyst (3)

First, a Ti—Si composite oxide was prepared as follows: 6.7 kg of a silica sol ("SNOWTEX-30" manufactured by Nissan Chemical Industries, Ltd.; containing 30 wt % in terms of $SiO_2$), 110 kg of industrial aqueous ammonia (containing 25 wt % $NH_3$) and 70 liter of water were mixed to prepare a uniform solution. To this solution was gradually added 257 liter of a solution of titanyl sulfate in sulfuric acid (manufactured by Tayca Corporation: containing 70 g/liter as $TiO_2$, 287 g/liter as $H_2SO_4$) dropwise while stirring. The resulting slurry was allowed to stand for about 20 hours, filtered, washed sufficiently with water, and dried at 100° C. for 1 hour. Further, this was calcined at 500° C. for 5 hours under air atmosphere, to obtain a Ti—Si composite oxide powder. A composition of the Ti—Si composite oxide powder was titanium oxide:silicon oxide=90:10 as expressed by a weight ratio in terms of oxide.

Then, vanadium was added to the Ti—Si composite oxide as follows: 1.29 kg of ammonium metavanadate, 1.67 kg of oxalic acid and 0.4 kg of monoethanolamine were mixed and dissolved in 8 liter of water, to prepare a uniform vanadium-containing solution. 19 kg of the Ti—Si composite oxide powder as obtained above was placed into a kneader, and a total amount of the vanadium-containing solution together with a molding aid containing an organic binder (starch 1.5 kg) was added, followed by sufficient stirring. Further, the materials were mixed well with a blender while adding an appropriate amount of water, kneaded sufficiently with a continuous kneader and extrusion—molded into a honeycomb. The resulting molding product was dried at 60° C., and calcined at 500° C. for 5 hours to obtain a mercury halogenating catalyst (3).

A composition of the resulting mercury halogenating catalyst (3) was Ti—Si composite oxide: vanadium oxide=95:5 (titanium oxide: silicon oxide: vanadium oxide=85.5:9.5:5 as expressed by a weight ratio in terms of oxide) as expressed by a weight ratio in terms of oxide.

Figure 12:
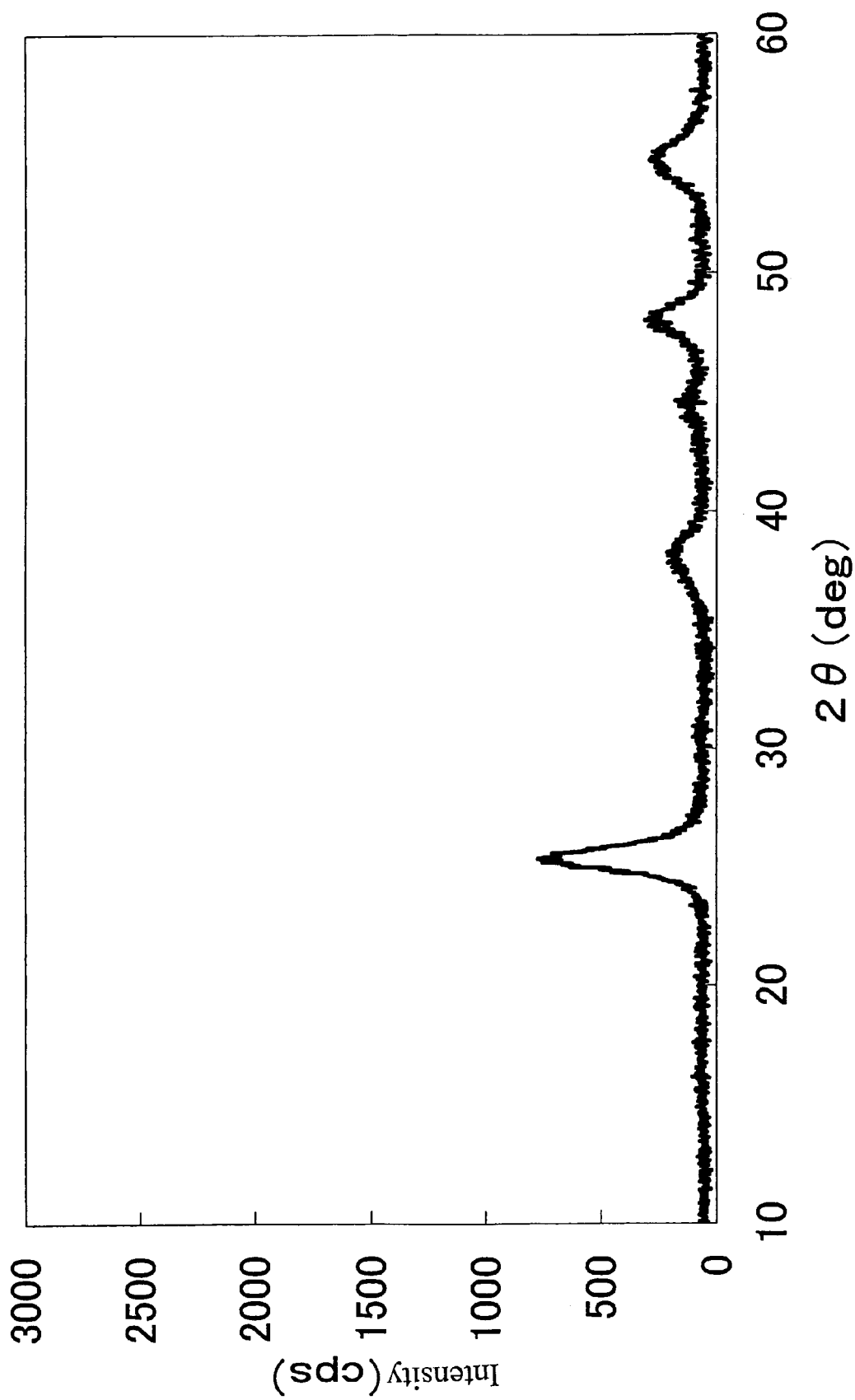
FIG. 12 is an X-ray diffraction pattern of a mercury halogenating catalyst (3)

A X-ray diffraction pattern of the mercury halogenating catalyst (3) is shown in FIG. 12. Since in FIG. 12, a clear inherent peak assignable to a substance other than $TiO_2$ was not recognized, and a broad peak assignable to anatase—type titanium oxide was recognized, it was confirmed that the mercury halogenating catalyst (3) is a composite oxide.

EXAMPLES 2-1 TO 2-2

Figure 13:
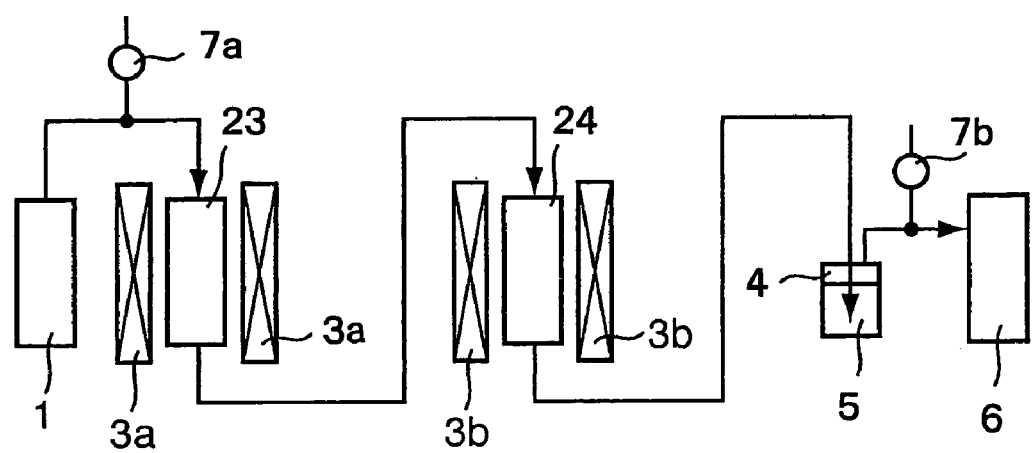
FIG. 13 is a schematic view of an exhaust gas treating system used in Examples 2-1 to 2-2, Comparative Examples 2-1 to 2-3, and Comparative Examples 3-1 to 3-4.

In an exhaust gas treating system shown in FIG. 13, a mimic exhaust gas having the following gas composition was treated using a mercury halogenating catalyst and a denitration catalyst shown in Table 2 at a catalyst temperature shown in Table 2, respectively. Upon treatment, a space velocity in a mercury halogenating apparatus was 3000 $Hr^{-1}$ and a space velocity in a denitration apparatus was 19000 $Hr^{-1}$.

[Gas Composition]:
NOx: 100 ppm
$NH_3$: 100 ppm
HCl: 5 ppm
Hg: 30 $\mu g/m^3 N$ (of this, metal mercury ($Hg^0$) is 18 $\mu g/m^3 N$)
$O_2$: 9%
$H_2O$: 10%

More particularly, first, a mimic exhaust gas placed in an exhaust gas container 1 was introduced into a denitration apparatus 23, and a nitrogen oxide was treated in the apparatus. Thereupon, a temperature of a denitration catalyst in the denitration apparatus 23 was controlled by a temperature controlling apparatus 3a. Then, a mimic exhaust gas was introduced into a mercury halogenating apparatus 24 provided with a mercury halogenating catalyst from the denitration apparatus 23, and metal mercury was converted into mercury halide in the apparatus. Thereupon, a temperature of a mercury halogenating catalyst in a mercury halogenating apparatus 24 was controlled by a temperature controlling apparatus 3b. Then, a mimic exhaust gas which had passed through the mercury halogenating apparatus 24 was introduced into an absorbing solution (3% aqueous calcium carbonate solution) 5 of an absorbing bottle 4, and mercury halide in a mimic exhaust gas was absorbed in an absorbing solution. Thereafter, a mimic exhaust gas was introduced into a recovering bottle 6 from the absorbing bottle 4, and recovered.

And, 10 hours and 500 hours after initiation of treatment, a gas a before treatment which was collected from a gas sampling port 7a disposed between the exhaust gas container 1 and the denitration apparatus 23, and a gas b after treatment which was collected from a gas sampling port 7b disposed between the absorbing bottle 4 and the recovering bottle 6 were measured for a concentration of NOx and a concentration of Hg ($Hg^0$ and $HgCl_2$) contained in each gas were measured, and a denitration rate and a mercury removal rate were obtained according to the following equation. Results are shown in Table 2.

<Denitration Rate>:

Denitration rate (%)={(NOx concentration of gas a)−(NOx concentration of gas b)}÷(NOx concentration of gas a)×100

<Mercury Removal Rate>:

Mercury removal rate (%)={(Hg concentration of gas a)−(Hg concentration of gas b)}÷(Hg concentration of gas a)×100

COMPARATIVE EXAMPLES 2-1 TO 2-3

In the same exhaust gas treating system as that of Examples 2-1 to 2-2, the same mimic exhaust gas as that of Example 2-1 to 2-2 was treated using a mercury halogenating catalyst and a denitration catalyst shown in Table 2 at a catalyst temperature shown in Table 2, respectively. Upon treatment, a space velocity in a mercury halogenating apparatus and a space velocity in the denitration apparatus were the same as those of Examples 2-1 to 2-2. And, a denitration rate and a mercury removal rate were obtained as in Examples 2-1 to 2-2. Results are shown in Table 2.

TABLE 2

|  | Denitration catalyst [total pore volume ($cm^3$/g)]/catalyst temperature (° C.) | Mercury halogenating catalyst/catalyst temperature (° C.) | Denitration rate (%) | | Mercury removal rate (%) | |
| --- | --- | --- | --- | --- | --- | --- |
|  |  |  | 10 hours | 500 hours | 10 hours | 500 hours |
| Example 2-1 | Denitration catalyst (1) [0.45]/400 | Mercury halogenating catalyst (1)/200 | 90.8 | 90.4 | 90.8 | 90.5 |
| Example 2-2 | Denitration catalyst (2) [0.44]/350 | Mercury halogenating catalyst (2)/200 | 91.9 | 91.7 | 96.5 | 96.4 |
| Comparative Example 2-1 | Denitration catalyst (3) [0.13]/350 | Mercury halogenating catalyst (3)/150 | 84.7 | 52.9 | 94.1 | 86.6 |
| Comparative Example 2-2 | Denitration catalyst (3) [0.13]/350 | None | 83.4 | 51.3 | 21.0 | 19.0 |
| Comparative Example 2-3 | Denitration catalyst (1) [0.45]/200 | Mercury halogenating catalyst (1)/400 | 72.6 | 40.4 | 32.0 | 14.3 |

EXAMPLES 3-1 TO 3-4

Figure 14:
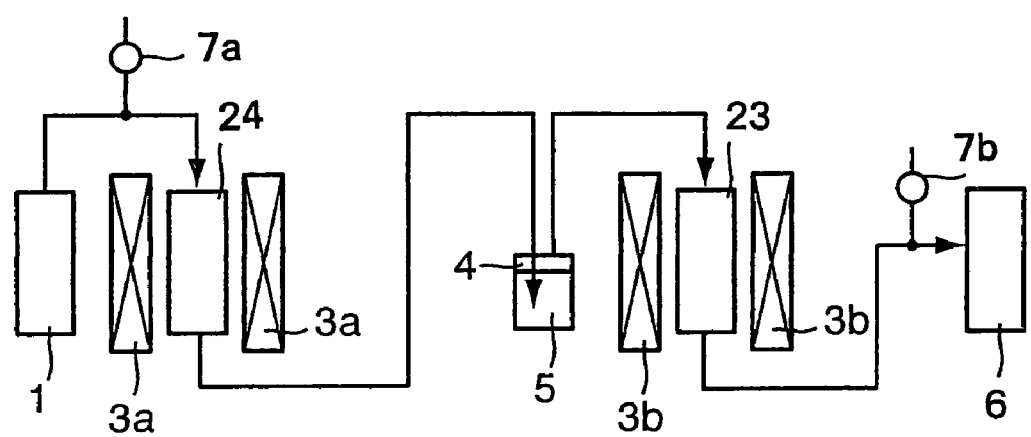
FIG. 14 is a schematic view of an exhaust gas treating system used in Examples 3-1 to 34.

In an exhaust gas treating system shown in FIG. 14, a mimic exhaust gas having the following gas composition was treated using a mercury halogenating catalyst and a denitration catalyst shown in Table 3 at a catalyst temperature shown in Table 3, respectively. Upon treatment, a space velocity in a mercury halogenating apparatus was 3000 Hr$^{-1}$, and a space velocity in a denitration apparatus was 13000 Hr$^{-1}$.

[Gas Composition]:
NOx: 100 ppm
NH$_3$: 100 ppm
HCl: 7 ppm
Hg: 25 μg/m$^3$N (of this, metal mercury (Hg$^0$) is 15 μg/m$^3$N)
O$_2$: 11%
H$_2$O: 15%

More particularly, first, a mimic exhaust gas placed in an exhaust gas container 1 was introduced into a mercury halogenating apparatus 24 provided with a mercury halogenating catalyst, and metal mercury was converted into mercury halide in the apparatus. Thereupon, a temperature of a mercury halogenating catalyst in the mercury halogenating apparatus 24 was controlled by a temperature controlling apparatus 3a. Then, a mimic exhaust gas which had passed through the mercury halogenating apparatus 24 was introduced into an absorbing solution (3% aqueous calcium carbonate solution) 5 in an absorbing bottle 4, and mercury halide in a mimic exhaust gas was absorbed in an absorbing solution. Then, a mimic exhaust gas was introduced into a denitration apparatus 23 from the absorbing bottle 4, and a nitrogen oxide was treated in the apparatus. Thereupon, a temperature of denitration catalyst in the denitration apparatus 23 was controlled by a temperature controlling apparatus 3b. Thereafter, a mimic exhaust gas was introduced into a recovering bottle 6 from the denitration apparatus 23, and recovered.

And, 10 hours and 1000 hours after initiation treatment, a gas a before treatment which was collected from a gas sampling port 7a disposed between the exhaust gas container 1 and the mercury halogenating apparatus 24, and a gas b after treatment which was collected from a gas sampling port 7b disposed between the denitration apparatus 23 and the covering bottle 6 were measured for a concentration of NOx and a concentration of Hg (Hg$^0$ and HgCl$_2$) in each gas, and a denitration rate and a mercury removal rate were obtained according to the following equation. Results are shown in Table 3.

<Denitration Rate>:

Denitration rate (%)={(NOx concentration of gas a)−(NOx concentration of gas b)}÷(NOx concentration of gas a)×100

<Mercury Removal Rate>:

Mercury removal rate (%)={(Hg concentration of gas a)−(Hg concentration of gas b)}÷(Hg concentration of gas a)×100

TABLE 3

| | Mercury halogenating catalyst/catalyst temperature | Denitration catalyst/catalyst temperature | Denitration rate (%) | | Mercury removal rate (%) | |
|---|---|---|---|---|---|---|
| | | | 10 hours | 1000 hours | 10 hours | 1000 hours |
| Example 3-1 | Mercury halogenating catalyst (1)/190° C. | Denitration catalyst (1)/250° C. | 91.8 | 89.5 | 92.5 | 91.9 |
| Example 3-2 | Mercury halogenating catalyst (2)/190° C. | Denitration catalyst (2)/250° C. | 94.3 | 94.2 | 94.3 | 94.1 |
| Example 3-3 | Mercury halogenating catalyst (3)/150° C. | Denitration catalyst (3)/250° C. | 93.2 | 92.0 | 92.0 | 90.7 |
| Example 3-4 | Mercury halogenating catalyst (3)/150° C. | Denitration catalyst (1)/250° C. | 92.8 | 91.5 | 91.5 | 90.1 |

COMPARATIVE EXAMPLES 3-1 TO 3-4

According to the same manners as those of Examples 3-1 to 3-4 except that an exhaust gas system was adopted in which a denitration apparatus 23 shown in FIG. 13 used in Examples 2-1 to 2-2 was disposed upstream of a mercury halogenating apparatus 24, in place of an exhaust gas treating system shown in FIG. 14, a mimic exhaust gas was treated.

More particularly, first, a mimic exhaust gas placed in an exhaust gas container 1 was introduced into a denitration apparatus 23, and a nitrogen oxide was treated in the apparatus. Thereupon, a temperature of a denitration catalyst in a denitration apparatus 23 was controlled by a temperature controlling apparatus 3a. Then, a mimic exhaust gas was introduced into a mercury halogenating apparatus 24 provided with a mercury halogenating catalyst from the denitration apparatus 23, and metal mercury was converted into mercury halide in the apparatus. Thereupon, a temperature of a mercury halogenating catalyst in the mercury halogenating apparatus 24 was controlled by a temperature controlling apparatus 3b. Then, a mimic exhaust gas which had passed through the mercury halogenating apparatus 24 was introduced into an absorbing solution (3% aqueous calcium carbonate solution) 5 in an absorbing bottle 4, and mercury halide in a mimic exhaust gas was absorbed in an absorbing solution. Thereafter, a mimic exhaust gas was introduced into a recovering bottle 6 from an absorbing bottle 4, and recovered.

And, 10 hours and 1000 hours after initiation of treatment, a gas a before treatment which was collected from a gas sampling port 7a disposed between the exhaust gas container 1 and the denitration apparatus 23, and a gas b after treatment which was collected from a gas sampling port 7b disposed between the absorbing bottle 4 and the recovering bottle 6 were measured for a concentration of NOx and a concentration of Hg ($Hg^0$ and $HgCl_2$) contained in each gas, and a denitration rate and a mercury removal rate were obtained as in Examples 3-1 to 3-4. Results are shown in Table 4.

TABLE 4

|  | Denitration catalyst/catalyst temperature | Mercury halogenating catalyst/catalyst temperature | Denitration rate (%) | | Mercury removal rate (%) | |
| --- | --- | --- | --- | --- | --- | --- |
|  |  |  | 10 hours | 1000 hours | 10 hours | 1000 hours |
| Comparative Example 3-1 | Denitration catalyst (1)/250° C. | Mercury halogenating catalyst (1)/190° C. | 91.6 | 74.4 | 91.7 | 74.5 |
| Comparative Example 3-2 | Denitration catalyst (2)/250° C. | Mercury halogenating catalyst (2)/190° C. | 94.2 | 80.8 | 92.4 | 77.6 |
| Comparative Example 3-3 | Denitration catalyst (3)/250° C. | Mercury halogenating catalyst (3)/150° C. | 93.0 | 73.6 | 91.5 | 70.9 |
| Comparative Example 3-4 | Denitration catalyst (1)/250° C. | Mercury halogenating catalyst (3)/150° C. | 92.6 | 64.7 | 89.5 | 59.4 |

INDUSTRIAL APPLICATION

The method according to the present invention for treating an exhaust gas can be applied to treatment of various exhaust gases discharged from, for example, a boiler, an incinerator, a gas turbine, a diesel engine and various industrial processes.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A method for treating an exhaust gas, comprising performing a reaction of changing metal mercury into mercury halide in the presence of a halogen compound and treatment of a nitrogen oxide using a Ti—V-containing catalyst, wherein a total pore volume of said Ti—V-containing catalyst, as measured by a mercury pressing method, is 0.20 to 0.80 cm$^3$/g.

2. The method for treating an exhaust gas according to claim 1, wherein the Ti—V-containing catalyst contains a binary or ternary composite oxide of one kind or two kinds selected from the group consisting of silicon, zirconium, aluminum, tungsten and molybdenum, as well as titanium.

3. The method for treating an exhaust gas according to claim 2, wherein the mercury halide is removed from an exhaust gas by capturing the mercury halide with an absorbing solution.

4. The method for treating an exhaust gas according to claim 1, wherein the mercury halide is removed from an exhaust gas by capturing the mercury halide with an absorbing solution.

5. The method for treating an exhaust gas according to claim 1, wherein said Ti—V-containing catalyst comprises a composite oxide of titanium (Ti) and one or more metals selected from the group consisting of silicon (Si), zirconium (Zr), aluminum (Al), tungsten (W), and molybdenum (Mo).

6. The method for treating an exhaust gas according to claim 1, wherein said composite oxide is an oxide not showing a clear inherent peak assignable to a substance other than $TiO_2$ and, regarding $TiO_2$, not showing an inherent peak assignable to anatase-type titanium oxide, or showing a broader diffraction peak than a diffraction peak of anatase-type titanium oxide if showing the peak, in a X-ray diffraction pattern.

7. A method for treating an exhaust gas, comprising treating a nitrogen oxide using a denitration catalyst, and thereafter converting metal mercury into mercury halide in the presence of a halogen compound using a mercury halogenating catalyst, wherein a catalyst having a total pore volume of 0.20 to 0.80 cm$^3$/g as measured by a mercury pressing method is used as the denitration catalyst, a catalyst temperature of the denitration catalyst is a temperature higher than 300° C., and a catalyst temperature of the mercury halogenating catalyst is 300° C. or lower.

8. The method for treating an exhaust gas according to claim 7, wherein the mercury halide is removed from an exhaust gas by capturing the mercury halide with an absorbing solution.

9. A method for treating an exhaust gas, comprising converting metal mercury into mercury halide in the presence of a halogen compound using a mercury halogenating catalyst, removing the mercury halide from an exhaust gas by capturing the mercury halide with an absorbing solution, and thereafter treating a nitrogen oxide using a denitration catalyst.

* * * * *